(12) United States Patent
Akanishi

(10) Patent No.: US 10,359,106 B2
(45) Date of Patent: Jul. 23, 2019

(54) BICYCLE SPROCKET AND BICYCLE SPROCKET ASSEMBLY

(71) Applicant: SHIMANO INC., Sakai (JP)

(72) Inventor: Kenichi Akanishi, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/192,028

(22) Filed: Jun. 24, 2016

(65) Prior Publication Data

US 2017/0370460 A1    Dec. 28, 2017

(51) Int. Cl.
*B62M 9/10* (2006.01)
*F16H 55/30* (2006.01)

(52) U.S. Cl.
CPC ............ *F16H 55/30* (2013.01); *B62M 9/10* (2013.01)

(58) Field of Classification Search
CPC ........ F16H 55/30; F16H 55/303; B62M 9/00; B62M 9/105; B62M 1/36
USPC ........................................ 474/152, 156, 155
See application file for complete search history.

(56) References Cited

U.S. PATENT DOCUMENTS

| | | | | |
|---|---|---|---|---|
| 586,991 | A * | 7/1897 | Curley | F16H 55/30 474/156 |
| 3,956,943 | A * | 5/1976 | Yamasaki | B62M 9/10 474/148 |
| 3,969,947 | A * | 7/1976 | Martin | F16H 55/30 474/152 |
| 4,174,642 | A * | 11/1979 | Martin | F16H 55/30 474/152 |
| 8,641,565 | B2 * | 2/2014 | Young | F16H 7/06 474/156 |
| 8,888,631 | B2 * | 11/2014 | Morita | F16H 7/06 474/153 |
| 9,182,027 | B2 | 11/2015 | Reiter et al. | |
| 9,291,250 | B2 * | 3/2016 | Reiter | B62M 9/105 |
| 9,540,070 | B2 * | 1/2017 | Watarai | B62M 9/02 |
| 2007/0054768 | A1 * | 3/2007 | Miyazawa | F16H 55/30 474/152 |
| 2007/0087878 | A1 * | 4/2007 | Ogawa | F16H 55/30 474/156 |
| 2013/0109519 | A1 * | 5/2013 | Morita | F16H 7/06 474/148 |
| 2013/0139642 | A1 * | 6/2013 | Reiter | B62M 9/105 74/594.2 |

(Continued)

FOREIGN PATENT DOCUMENTS

CN    104802919    7/2015
CN    105083461    11/2015

*Primary Examiner* — Henry Y Liu
(74) *Attorney, Agent, or Firm* — Mori & Ward, LLP

(57) ABSTRACT

A bicycle sprocket comprises a sprocket body and a plurality of chain-driving teeth. The plurality of chain-driving teeth comprises a first tooth and a second tooth. The first tooth has a first radial length radially defined from a reference line to a first radially outermost end. The second tooth has a second radial length radially defined from the reference line to a second radially outermost end. The second radial length is in a range of 1.5 mm to 2.9 mm. A shortest distance is defined between the downstream circumferential surface and a first intersection point of the circumferential center plane and an additional reference line. The shortest distance is equal to or larger than 2.0 mm. The additional reference line is defined at a reference position radially outward spaced apart from the reference line by 1.5 mm.

23 Claims, 19 Drawing Sheets

(56) References Cited

U.S. PATENT DOCUMENTS

| | | | |
|---|---|---|---|
| 2013/0184110 A1* | 7/2013 | Reiter | F16H 55/303 |
| | | | 474/152 |
| 2014/0100069 A1* | 4/2014 | Reiter | B62M 9/105 |
| | | | 474/156 |
| 2014/0338494 A1* | 11/2014 | Sugimoto | B62M 1/36 |
| | | | 74/594.2 |
| 2014/0364259 A1* | 12/2014 | Reiter | B62M 9/10 |
| | | | 474/155 |
| 2015/0198231 A1* | 7/2015 | Emura | B62M 9/105 |
| | | | 474/156 |
| 2015/0203173 A1* | 7/2015 | Nishimoto | B62M 9/02 |
| | | | 474/152 |
| 2015/0226306 A1* | 8/2015 | Pfeiffer | B62M 9/105 |
| | | | 474/152 |
| 2015/0239528 A1* | 8/2015 | Barefoot | B62M 9/00 |
| | | | 474/152 |
| 2015/0291255 A1* | 10/2015 | Nishimoto | B62M 9/105 |
| | | | 474/152 |
| 2015/0337943 A1* | 11/2015 | Sugimoto | B62M 9/02 |
| | | | 474/152 |
| 2016/0052597 A1* | 2/2016 | Reiter | B62M 9/105 |
| | | | 474/148 |
| 2016/0052598 A1* | 2/2016 | Reiter | B62M 9/105 |
| | | | 474/148 |
| 2016/0052599 A1* | 2/2016 | Reiter | B62M 9/105 |
| | | | 474/148 |

\* cited by examiner

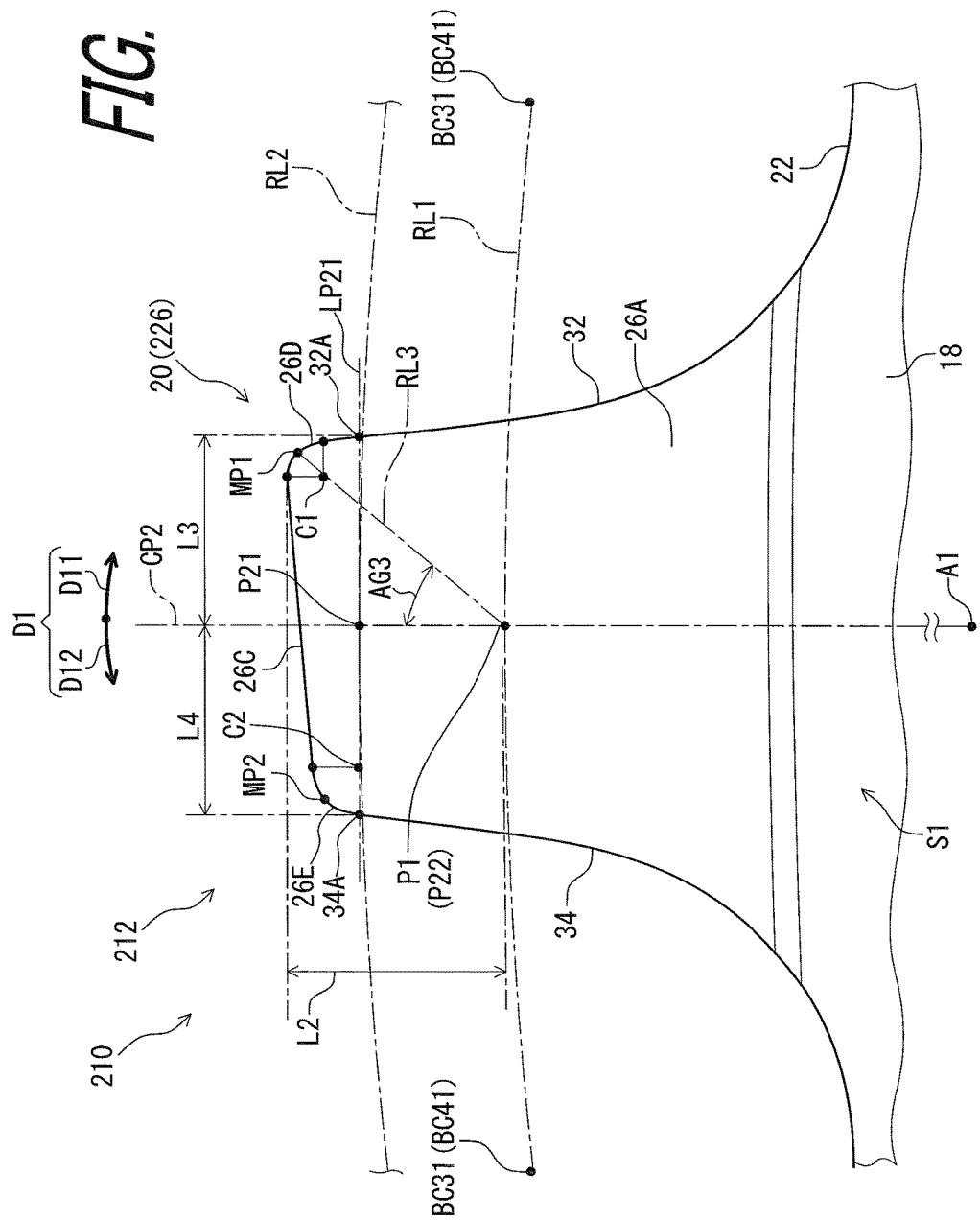

BICYCLE SPROCKET AND BICYCLE SPROCKET ASSEMBLY

BACKGROUND OF THE INVENTION

Field of the Invention

The present invention relates to a bicycle sprocket and a bicycle sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket comprises a sprocket body and a plurality of chain-driving teeth. The sprocket body includes a radially outer periphery provided about a rotational center axis of the bicycle sprocket. The plurality of chain-driving teeth are provided on the radially outer periphery to engage with a bicycle chain. The plurality of chain-driving teeth comprises a first tooth and a second tooth. The first tooth has a first maximum chain-engaging width defined in an axial direction parallel to the rotational center axis. The first tooth includes a first radially outermost end radially farthest from the radially outer periphery of the sprocket body. The first tooth has a first radial length radially defined from a reference line to the first radially outermost end. The second tooth has a second chain-engaging maximum width defined in the axial direction. The first maximum chain-engaging width is larger than an inner link space defined between an opposed pair of inner link plates of the bicycle chain and smaller than an outer link space defined between an opposed pair of outer link plates of the bicycle chain. The second chain-engaging maximum width is smaller than the inner link space. The second tooth includes a second radially outermost end radially farthest from the radially outer periphery of the sprocket body. The second tooth has a second radial length radially defined from the reference line to the second radially outermost end. The second radial length is in a range of 1.5 mm to 2.9 mm. The second tooth includes a circumferential center plane, a downstream circumferential surface, and a shortest distance. The circumferential center plane radially extends from the rotational center axis through a center point of a reference line. The reference line is defined to connect centers of pins of the bicycle chain engaged with the plurality of chain-driving teeth. The downstream circumferential surface is in a driving rotational direction in which the bicycle sprocket rotates about the rotational center axis during pedaling. The downstream circumferential surface is disposed on a downstream side of the circumferential center plane in the driving rotational direction. The shortest distance is defined between the downstream circumferential surface and a first intersection point of the circumferential center plane and an additional reference line. The shortest distance is equal to or larger than 2.0 mm. The additional reference line is defined at a reference position radially outward spaced apart from the reference line by 1.5 mm.

With the bicycle sprocket according to the first aspect, it is possible to provide an earlier timing at which the second tooth catches the opposed pair of inner link plates of the bicycle chain. Accordingly, it is possible to smoothly bring the second tooth into engagement with the opposed pair of inner link plates even if the bicycle chain is largely inclined relative to the bicycle sprocket when viewed from above the bicycle sprocket. This can improve a chain-holding performance of the bicycle sprocket.

In accordance with a second aspect of the present invention, the bicycle sprocket according to the first aspect is configured so that the first radial length is larger than the second radial length.

With the bicycle sprocket according to the second aspect, it is possible to increase an area of the chain-engaging surface of the first tooth. This can reduce an inclination angle of the opposed pair of outer link plates relative to the bicycle sprocket even if the bicycle chain is inclined relative to the bicycle sprocket when viewed from above the bicycle sprocket. This can further improve the chain-holding performance of the bicycle sprocket.

In accordance with a third aspect of the present invention, the bicycle sprocket according to any one of the above aspects is configured so that the second radial length is in a range of 2.0 mm to 2.5 mm.

With the bicycle sprocket according to the third aspect, it is possible to adjust the second radial length to a suitable radial length for providing the earlier timing at which the second tooth catches the opposed pair of inner link plates of the bicycle chain. This can further improve the chain-holding performance of the bicycle sprocket.

In accordance with a fourth aspect of the present invention, the bicycle sprocket according to any one of the above aspects is configured so that the second tooth includes a second connecting surface extending between the downstream circumferential surface and the second radially outermost end, the downstream connecting surface including a middle point defined between the downstream circumferential surface and the second radially outermost end when viewed from the axial direction. An inclined reference line is defined between the middle point of the downstream connecting surface and a second intersection point of the circumferential center plane and the reference line when viewed from the axial direction. An inclination angle defined between the circumferential center plane and the inclined reference line is in a range of 32 degrees to 52 degrees when viewed from the axial direction.

With the bicycle sprocket according to the fourth aspect, it is possible to adjust a position of the downstream connecting surface to a suitable position for providing the earlier timing at which the second tooth catches the opposed pair of inner link plates of the bicycle chain. This can further improve the chain-holding performance of the bicycle sprocket. The inclination angle is an optimum angle for the second radial length having the range of 2.0 mm to 2.5 mm.

In accordance with a fifth aspect of the present invention, the bicycle sprocket according to any one of the above aspects is configured so that the second radial length is in a range of 2.5 mm to 2.9 mm.

With the bicycle sprocket according to the fifth aspect, it is possible to adjust the second radial length to a suitable radial length for providing the earlier timing at which the second tooth catches the opposed pair of inner link plates of the bicycle chain. This can further improve the chain-holding performance of the bicycle sprocket.

In accordance with a sixth aspect of the present invention, the bicycle sprocket according to any one of the above aspects is configured so that the second tooth includes a downstream connecting surface extending between the downstream circumferential surface and the second radially outermost end, the downstream connecting surface including a middle point defined between the downstream circumferential surface and the second radially outermost end when viewed from the axial direction. An inclined reference line is defined between the middle point of the downstream connecting surface and a second intersection point of the circumferential center plane and the reference line when viewed from the axial direction. An inclination angle defined between the circumferential center plane and the inclined reference line is in a range of 29 degrees to 36.4 degrees when viewed from the axial direction.

With the bicycle sprocket according to the sixth aspect, it is possible to adjust a position of the downstream connecting surface to a suitable position for providing the earlier timing at which the second tooth catches the opposed pair of inner link plates of the bicycle chain. This can further improve the chain-holding performance of the bicycle sprocket. The inclination angle is an optimum angle for the second radial length having the range of 2.5 mm to 2.9 mm.

In accordance with a seventh aspect of the present invention, the bicycle sprocket according to any one of the above aspects is configured so that a difference between the first radial length and the second radial length is equal to or smaller than 1.5 mm.

With the bicycle sprocket according to the seventh aspect, it is possible to adjust the first radial length and the second radial length to suitable radial lengths for providing the earlier timing at which the second tooth catches the opposed pair of inner link plates of the bicycle chain. This can further improve the chain-holding performance of the bicycle sprocket.

In accordance with an eighth aspect of the present invention, the bicycle sprocket according to any one of the above aspects is configured so that a difference between the first radial length and the second radial length is equal to or smaller than 1.0 mm.

With the bicycle sprocket according to the eighth aspect, it is possible to further adjust the first radial length and the second radial length to suitable radial lengths for providing the earlier timing at which the second tooth catches the opposed pair of inner link plates of the bicycle chain. This can further improve the chain-holding performance of the bicycle sprocket.

In accordance with a ninth aspect of the present invention, the bicycle sprocket according to any one of the above aspects is configured so that the first radial length is equal to or larger than 3.0 mm With the bicycle sprocket according to the ninth aspect, it is possible to increase an area of the chain-engaging surface of the first tooth. This can reduce an inclination angle of the opposed pair of outer link plates relative to the bicycle sprocket even if the bicycle chain is inclined relative to the bicycle sprocket when viewed from above the bicycle sprocket. This can further improve the chain-holding performance of the bicycle sprocket.

In accordance with a tenth aspect of the present invention, the bicycle sprocket according to any one of the above aspects is configured so that the first radial length is equal to or smaller than 4.0 mm.

With the bicycle sprocket according to the tenth aspect, it is possible to increase an area of the chain-engaging surface of the first tooth. This can reduce an inclination angle of the opposed pair of outer link plates relative to the bicycle sprocket even if the bicycle chain is inclined relative to the bicycle sprocket when viewed from above the bicycle sprocket. This can further improve the chain-holding performance of the bicycle sprocket. Furthermore, it is possible to prevent a tooth tip of the first tooth from protruding radially outward from the opposed pair of outer link plates. This can reduce damage of the tooth tip of the first tooth caused by collision with an obstacle.

In accordance with an eleventh aspect of the present invention, the bicycle sprocket according to any one of the above aspects is configured so that the second tooth includes a downstream connecting surface, an upstream circumferential surface, and an upstream connecting surface. The downstream connecting surface extends between the downstream circumferential surface and the second radially outermost end. The upstream circumferential surface faces in a reversing rotational direction opposite to the driving rotational direction. The upstream circumferential surface is disposed on an upstream side of the circumferential center plane in the driving rotational direction. The upstream connecting surface extends between the upstream circumferential surface and the second radially outermost end. The downstream connecting surface is farther radially outward from the reference line than the upstream connecting surface.

With the bicycle sprocket according to the eleventh aspect, it is possible to save weight of the bicycle sprocket with providing the earlier timing at which the second tooth catches the opposed pair of inner link plates of the bicycle chain.

In accordance with a twelfth aspect of the present invention, the bicycle sprocket according to any one of the above aspects is configured so that the downstream connecting surface includes a middle point defined between the downstream circumferential surface and the second radially outermost end when viewed from the axial direction. The upstream connecting surface includes a middle point defined between the upstream circumferential surface and the second radially outermost end when viewed from the axial direction. The middle point of the downstream connecting surface is radially outward farther from the reference line than the middle point of the upstream connecting surface.

With the bicycle sprocket according to the twelfth aspect, it is possible to save weight of the bicycle sprocket with providing the earlier timing at which the second tooth catches the opposed pair of inner link plates of the bicycle chain.

In accordance with a thirteenth aspect of the present invention, the bicycle sprocket according to any one of the above aspects is configured so that the second tooth includes an upstream circumferential surface and an additional shortest distance. The upstream circumferential surface faces in a reversing rotational direction opposite to the driving rotational direction. The upstream circumferential surface is disposed on an upstream side of the circumferential center plane in the driving rotational direction. The additional shortest distance is defined between the circumferential center plane and the upstream circumferential surface on the additional reference line. The additional shortest distance is smaller than 2.0 mm.

With the bicycle sprocket according to the thirteenth aspect, it is possible to save weight of the bicycle sprocket with providing the earlier timing at which the second tooth catches the opposed pair of inner link plates of the bicycle chain.

In accordance with a fourteenth aspect of the present invention, the bicycle sprocket according to any one of the above aspects further comprises a crank attachment part to couple the sprocket body to a bicycle crank.

With the bicycle sprocket according to the fourteenth aspect, it is possible to apply the structure of the bicycle sprocket to a front sprocket.

In accordance with a fifteenth aspect of the present invention, a bicycle sprocket assembly comprises the bicycle sprocket according to any one of the above aspects. The bicycle sprocket is a single sprocket without another sprocket in the bicycle sprocket assembly.

With the bicycle sprocket according to the fifteenth aspect, it is possible to further improve the chain-holding performance of the bicycle sprocket assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 19 is an enlarged side elevational view of a second tooth of a bicycle sprocket in accordance with a second embodiment.

DESCRIPTION OF THE EMBODIMENTS

Figure 1:
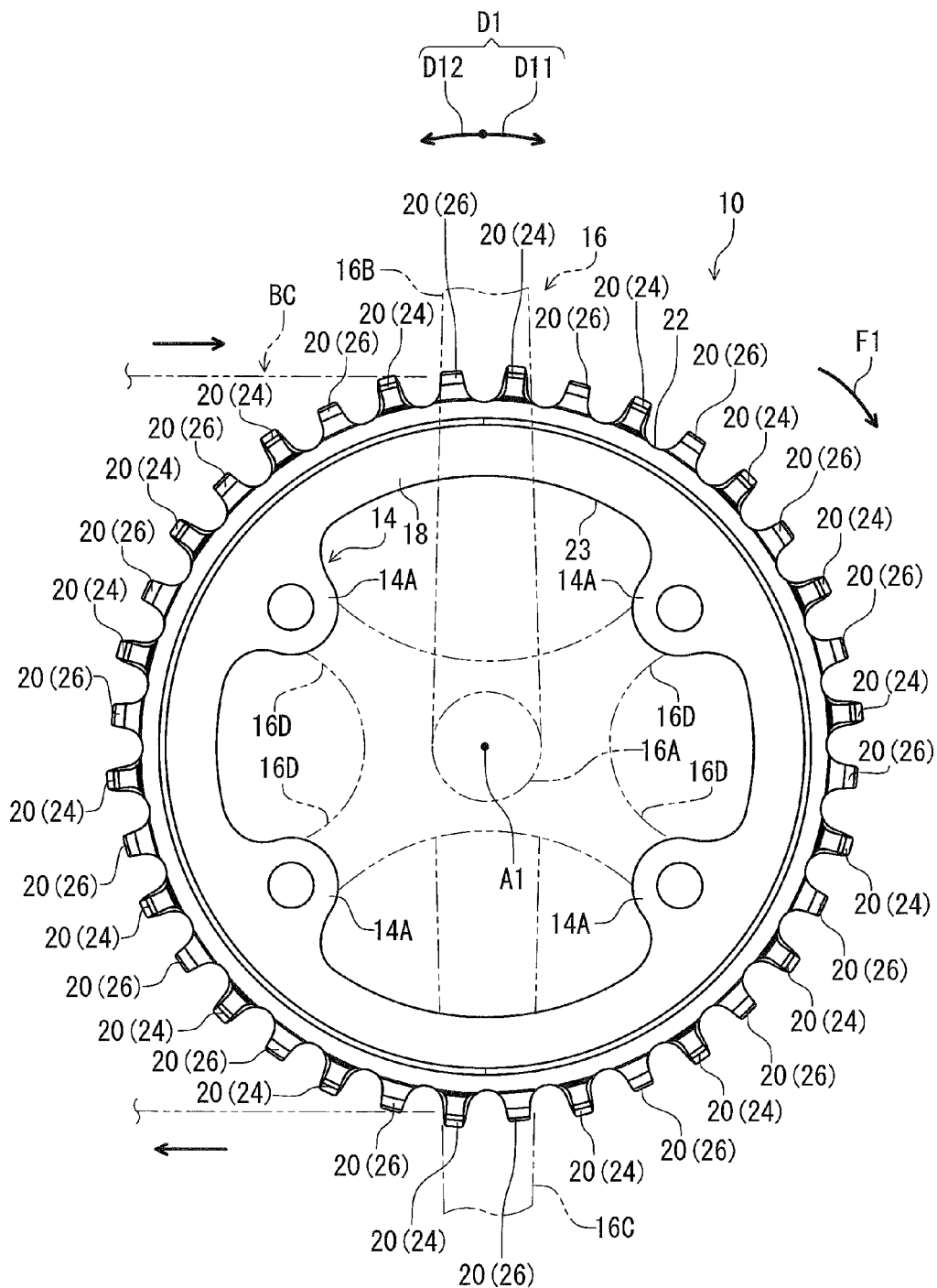
FIG. 1 is a side elevational view of a bicycle sprocket assembly including a bicycle sprocket in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle sprocket assembly 10 comprises a bicycle sprocket 12 in accordance with a first embodiment. The bicycle sprocket 12 has a rotational center axis A1. The bicycle sprocket 12 is rotatable about the rotational center axis A1 relative to a bicycle frame (not shown). The bicycle sprocket 12 is engaged with a bicycle chain BC to transmit a rotational driving force F1 to the bicycle chain BC. In this embodiment, the bicycle sprocket 12 is a single sprocket without another sprocket in the bicycle sprocket assembly. However, the bicycle sprocket assembly 10 can comprises another sprocket in addition to the bicycle sprocket 12. Furthermore, the bicycle sprocket assembly 10 is a front sprocket assembly. However, structures of the bicycle sprocket assembly 10 can be applied to rear sprocket assembly.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket 12 of the bicycle sprocket assembly 10, should be interpreted relative to the bicycle equipped with the bicycle sprocket 12 as used in an upright riding position on a horizontal surface.

Figure 2:
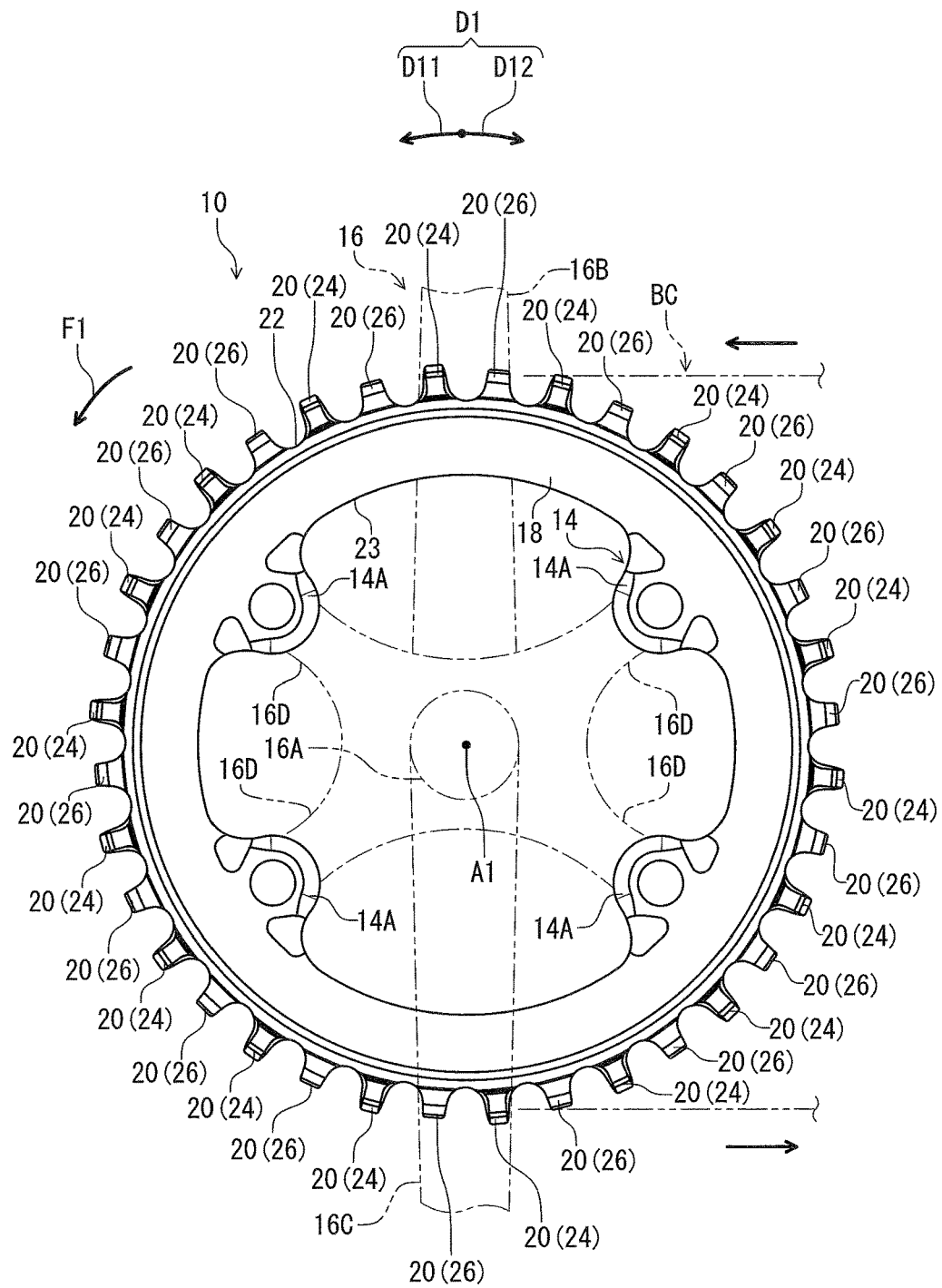
FIG. 2 is another side elevational view of the bicycle sprocket assembly illustrated in FIG. 1.
Figure 3:
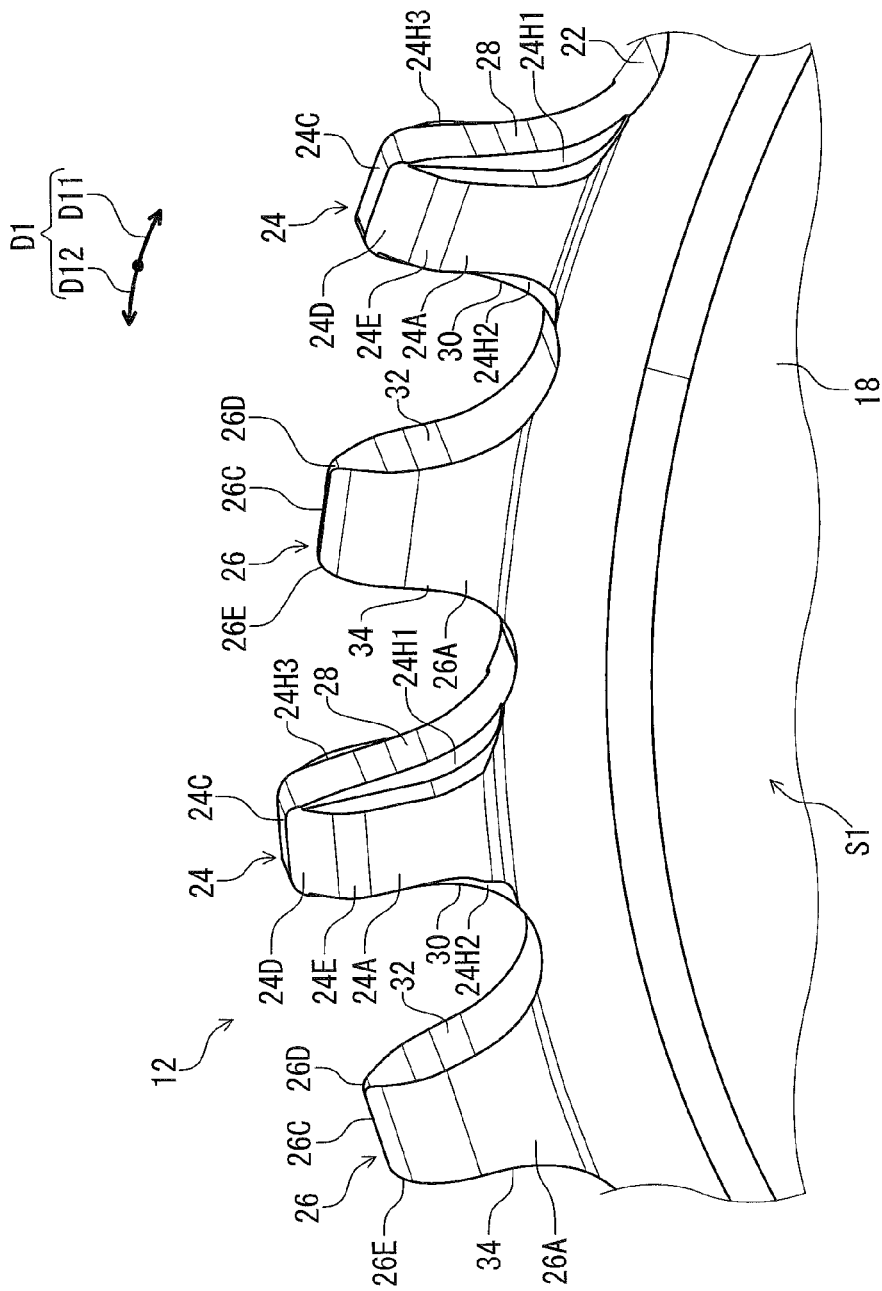
FIG. 3 is a partial perspective view of the bicycle sprocket of the bicycle sprocket assembly illustrated in FIG. 1.
Figure 4:
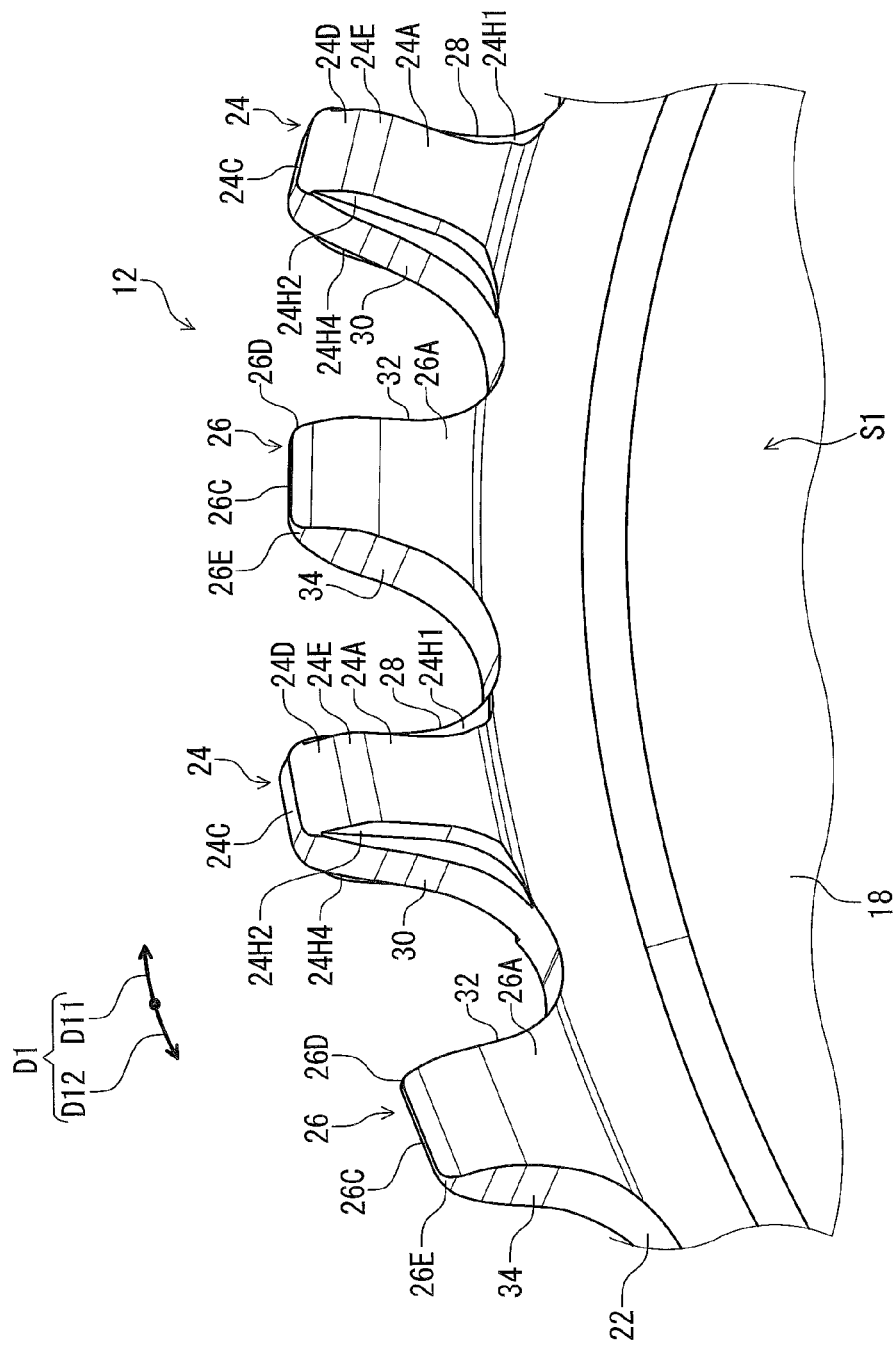
FIG. 4 is another partial perspective view of the bicycle sprocket of the bicycle sprocket assembly illustrated in FIG. 1.
Figure 5:
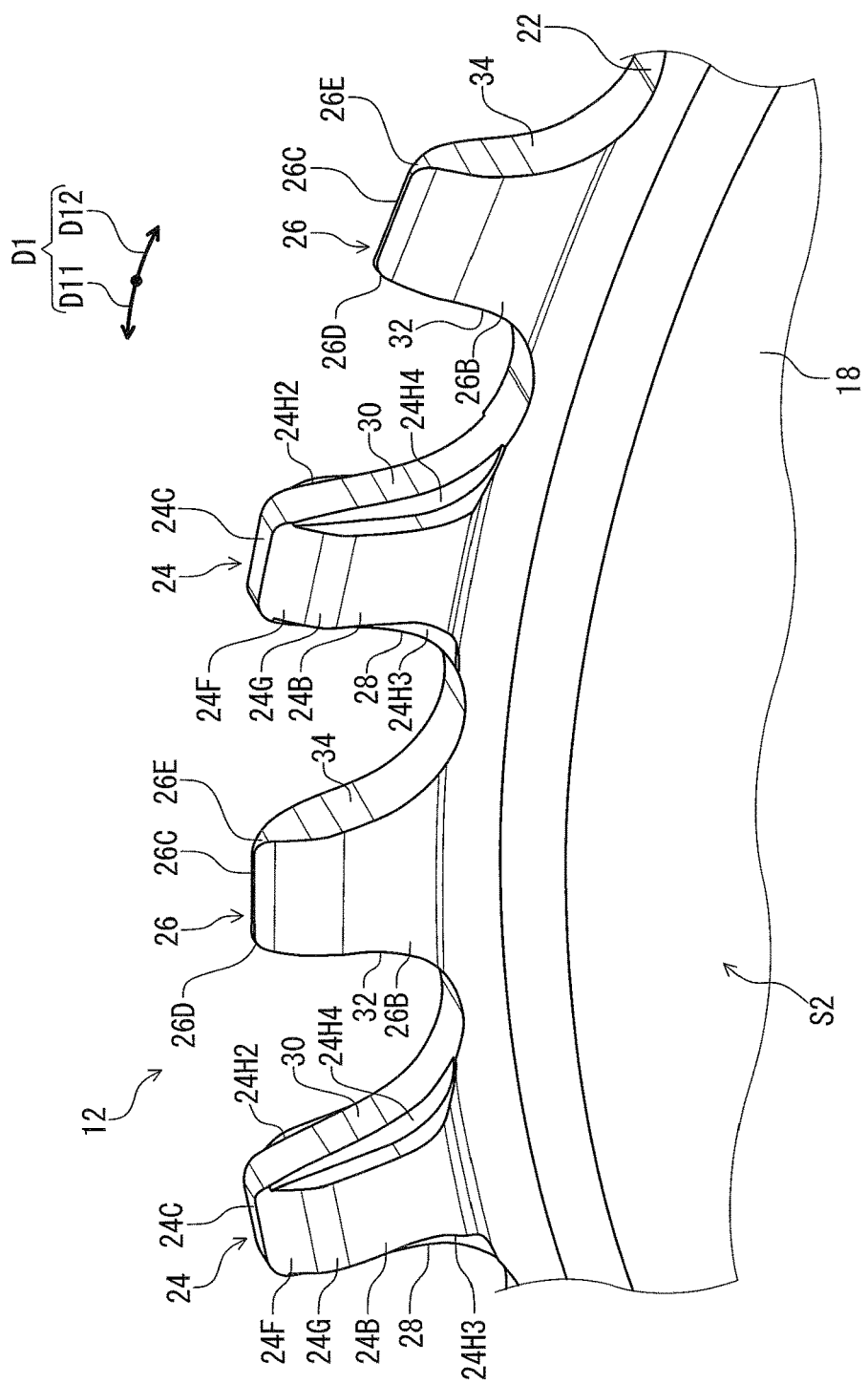
FIG. 5 is another partial perspective view of the bicycle sprocket of the bicycle sprocket assembly illustrated in FIG. 1.
Figure 6:
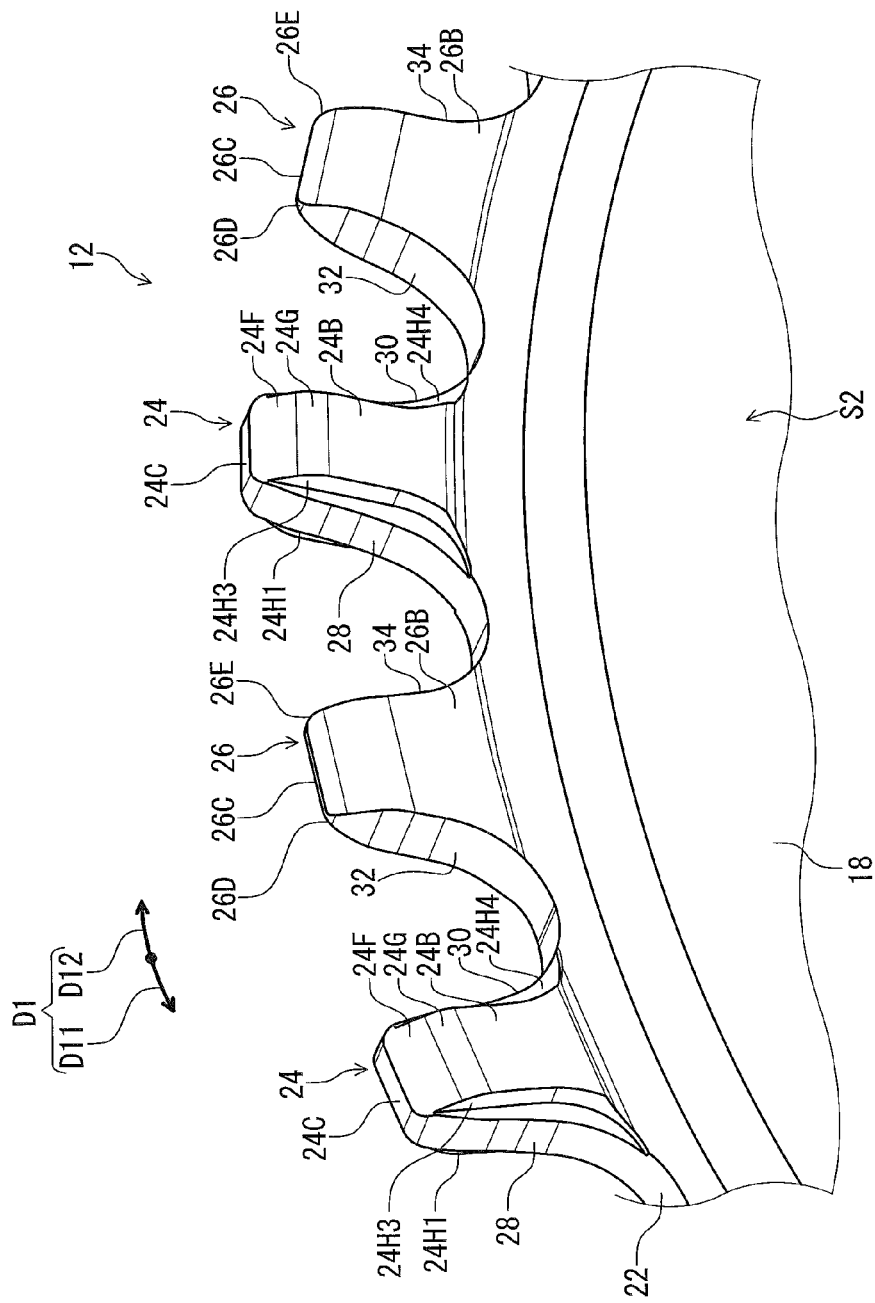
FIG. 6 is another partial perspective view of the bicycle sprocket of the bicycle sprocket assembly illustrated in FIG. 1.

As seen in FIGS. 1 and 2, the bicycle sprocket 12 further comprises a crank attachment part 14 to couple the sprocket body 18 to a bicycle crank 16. In this embodiment, the bicycle sprocket assembly 10 further comprises a bicycle crank 16. The bicycle crank 16 includes a crank axle 16A, a right crank aim 16B, a left crank aim 16C, and connecting arms 16D. The crank attachment part 14 includes crank attachment portions 14A. The crank connecting arms 16D are respectively fastened to the crank attachment portions 14A with fasteners such as bolts (not shown).

The right crank arm 16B and the left crank arm 16C are secured to the crank axle 16A. The right crank arm 16B and the left crank arm 16C are rotatably mounted to the bicycle frame about the rotational center axis A1 via the crank axle 16A. The crank attachment part 14 is coupled to the right crank arm 16B via the connecting arms 16D to be rotatable integrally with the right crank arm 16B about the rotational center axis A1. The crank attachment part 14 can also be integrally provided with the right crank arm 16B as a one-piece unitary member. Namely, the bicycle sprocket 12 is rotatable integrally with the crank attachment part 14 and the right crank arm 16B about the rotational center axis A1. The bicycle sprocket 12 is rotatable about the rotational center axis A1 in a driving rotational direction D11 during pedaling. The driving rotational direction D11 is defined along a circumferential direction D1 defined about the rotational center axis A1.

As seen in FIGS. 1 and 2, the bicycle sprocket 12 comprises a sprocket body 18 and a plurality of chain-driving teeth 20. The sprocket body 18 includes a radially outer periphery 22 provided about the rotational center axis A1 of the bicycle sprocket 12. The sprocket body 18 includes a radially inner periphery 23 provided about the rotational center axis A1. The radially outer periphery 22 is provided radially outward of the radially inner periphery 23. The crank attachment part 14 extends radially inward from the radially inner periphery 23.

The plurality of chain-driving teeth 20 are provided on the radially outer periphery 22 to engage with the bicycle chain BC. The plurality of chain-driving teeth 20 comprises a first tooth 24 and a second tooth 26. In this embodiment, the plurality of chain-driving teeth 20 comprises a plurality of first teeth 24 and a plurality of second teeth 26. A total number of the first teeth 24 is equal to a total number of the second teeth 26. The total number of the first teeth 24 and the total number of the second teeth 26 are not limited to this embodiment. The first teeth 24 and the second teeth 26 are alternately arranged in the circumferential direction D1. However, the arrangement of the first and second teeth 26 is not limited to this embodiment. The first tooth 24 has a shape different from a shape of the second tooth 26.

As seen in FIGS. 3 to 6, the first tooth 24 includes a downstream circumferential surface 28 (a first downstream circumferential surface 28) and an upstream circumferential surface 30 (a first upstream circumferential surface 30). The downstream circumferential surface 28 faces in a driving rotational direction D11 in which the bicycle sprocket 12 rotates about the rotational center axis A1 during pedaling. The driving rotational direction D11 is a direction in which the bicycle sprocket 12 is rotated to transmit a pedaling force from the bicycle sprocket 12 to the bicycle chain BC during pedaling to forward move a bicycle equipped with the bicycle sprocket assembly 10. The upstream circumferential surface 30 faces in a reversing rotational direction D12 opposite to the driving rotational direction D11.

The second tooth 26 includes a downstream circumferential surface 32 (a second downstream circumferential surface 32) and an upstream circumferential surface 34 (a second upstream circumferential surface 34). The downstream circumferential surface 32 faces in the driving rotational direction D11 in which the bicycle sprocket 12 rotates about the rotational center axis A1 during pedaling. The upstream circumferential surface 34 faces in the reversing rotational direction D12 opposite to the driving rotational direction D11.

Figure 7:
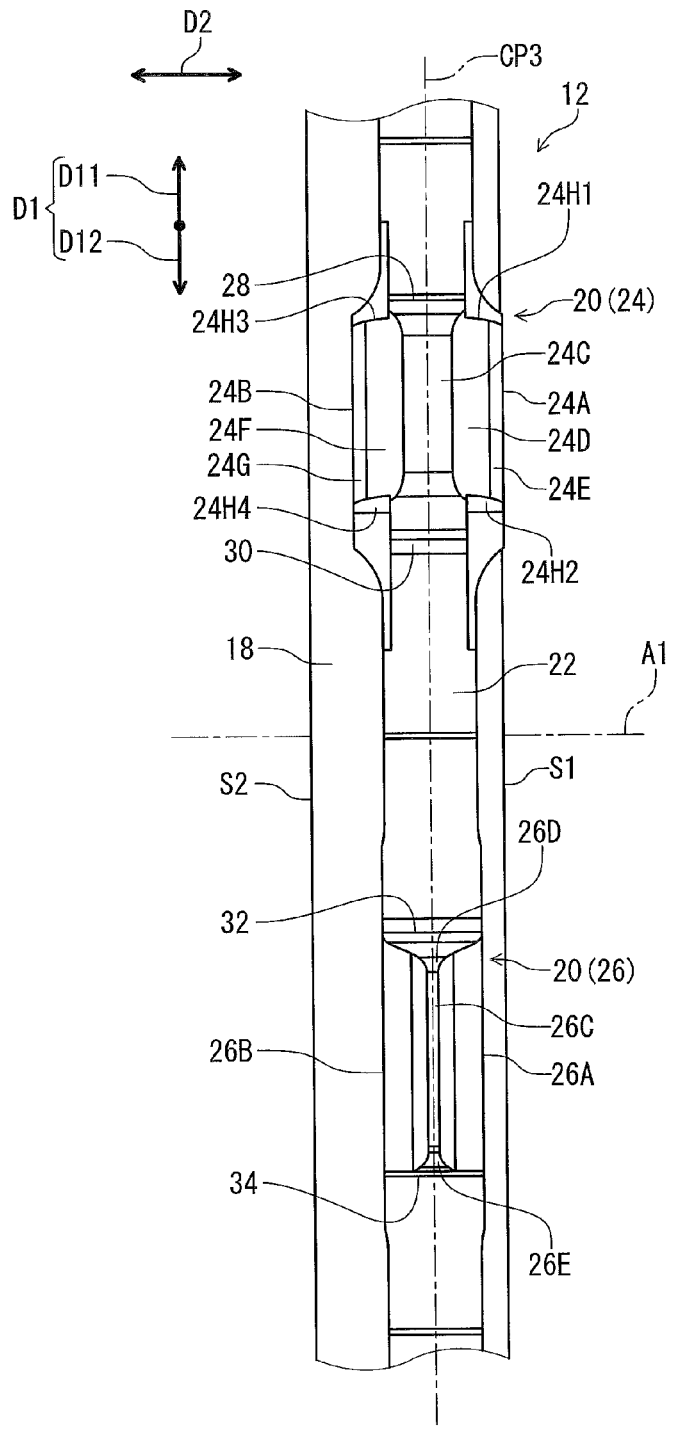
FIG. 7 is a partial top view of the bicycle sprocket of the bicycle sprocket assembly illustrated in FIG. 1.

As seen in FIG. 7, the first tooth 24 has a symmetrical shape with respect to an axial center plane CP3 perpendicular to the rotational center axis A1. The second tooth 26 has a symmetrical shape with respect to the axial center plane CP3. However, at least one of the first tooth 24 and the second tooth 26 can have an asymmetrical shape with respect to the axial center plane CP3.

The bicycle sprocket 12 comprises a first side surface S1 and a second side surface S2 opposite to the first side surface S1 in a axial direction D2 parallel to the rotational center axis A1. In this embodiment, the second side surface S2 is closer to the bicycle frame (not shown) than the first side surface S1 in the axial direction S2. Thus, the first side surface S1 is an axially outer side surface and the second side surface S2 is an axially inner side surface in a state where the bicycle sprocket assembly 10 is mounted to the bicycle frame. However, the first side surface S1 can be closer to the bicycle frame (not shown) than the second side surface S2 in the axial direction S2.

Figure 8:
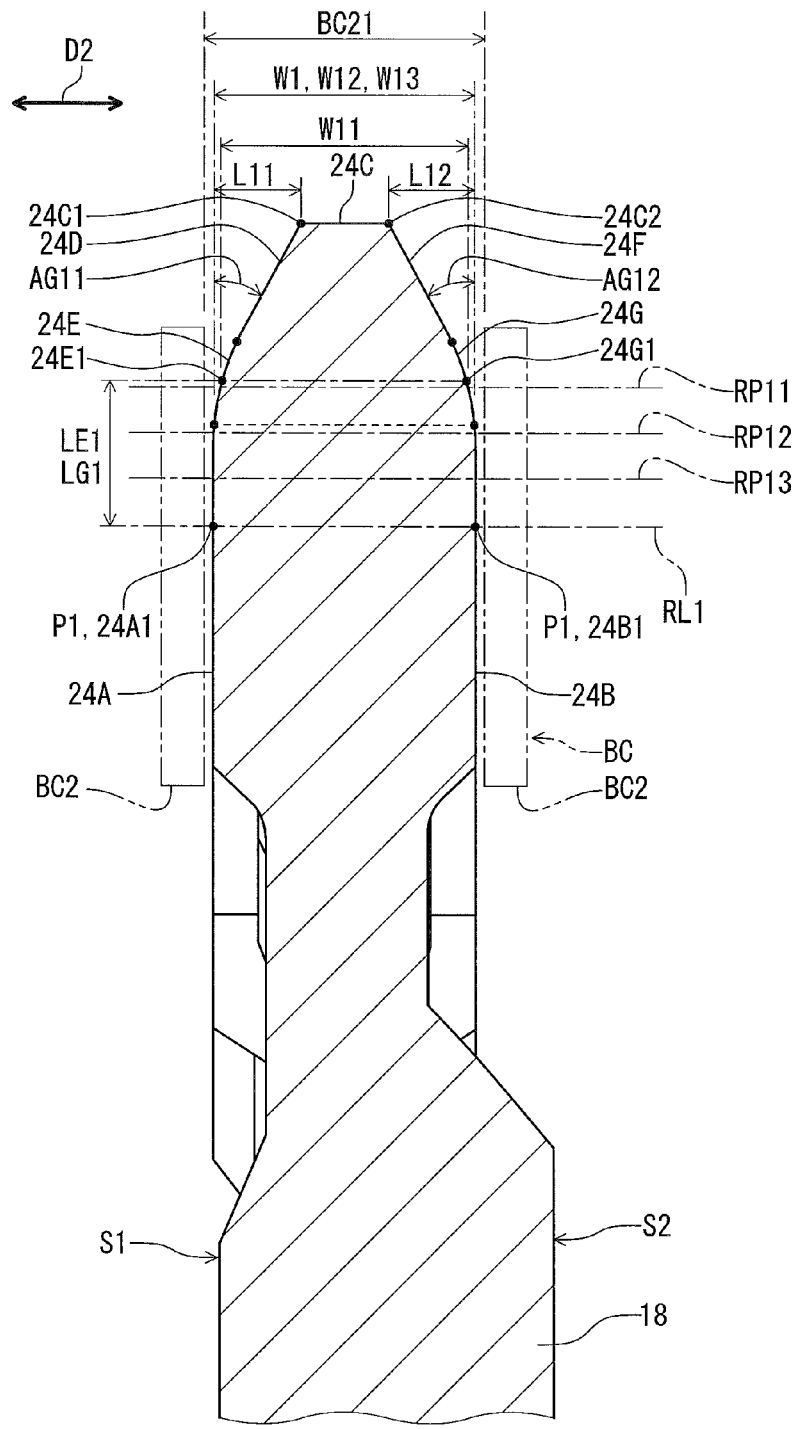
FIG. 8 is a cross-sectional view of the bicycle sprocket taken along line VIII-VIII of FIG. 10.
Figure 9:
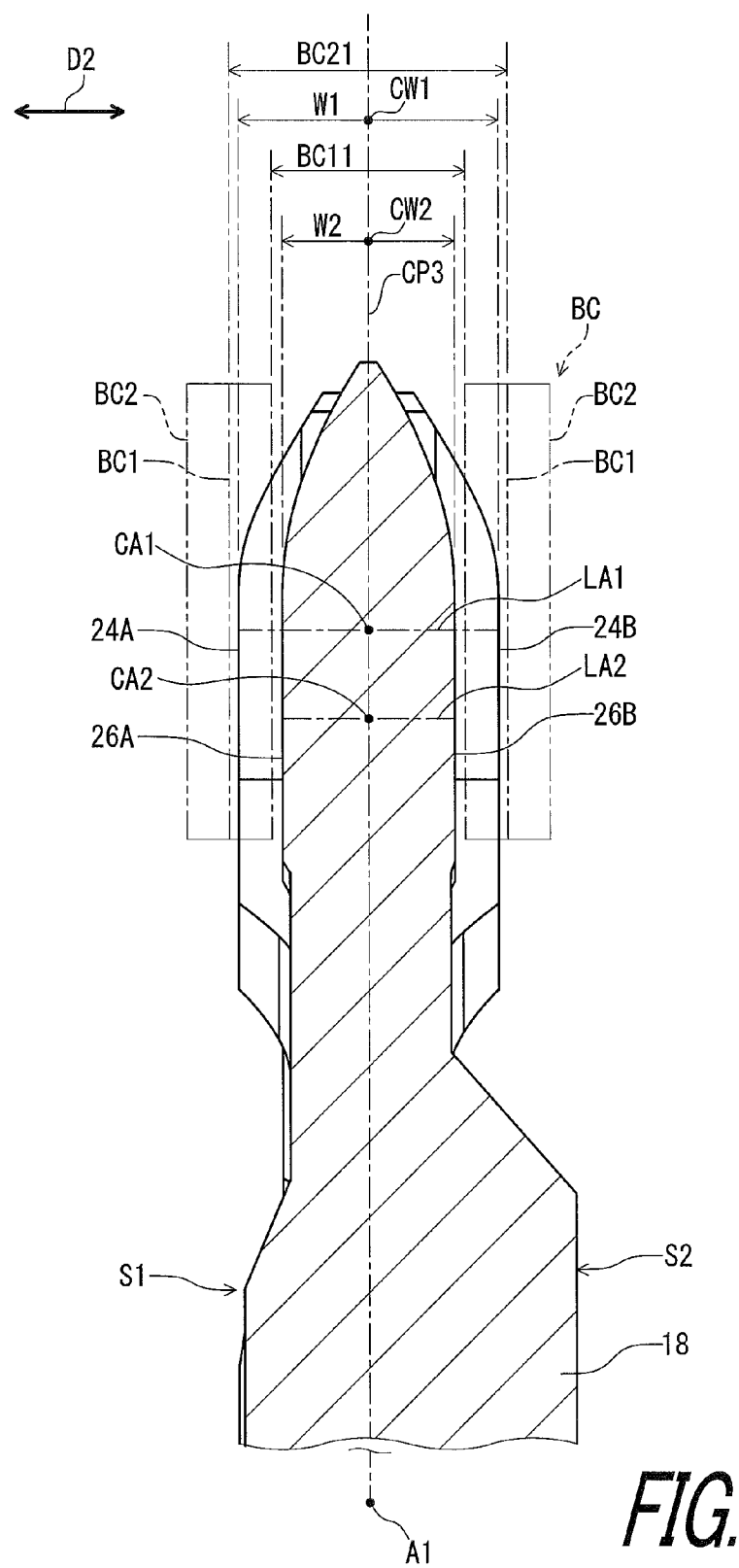
FIG. 9 is a cross-sectional view of the bicycle sprocket taken along line IX-IX of FIG. 10.

As seen in FIGS. 8 and 9, the first tooth 24 has a first maximum chain-engaging width W1 defined in the axial direction D2 parallel to the rotational center axis A1. The first maximum chain-engaging width W1 is larger than an inner link space BC11 defined between an opposed pair of inner link plates BC1 of the bicycle chain BC and smaller than an outer link space BC21 defined between an opposed pair of outer link plates BC2 of the bicycle chain BC.

As seen in FIG. 8, the first tooth 24 includes a first axial surface 24A to engage with one of the opposed pair of outer link plates BC2. The first axial surface 24A may include a first chain facing area to face the outer link plate BC2 in the axial direction D2 during the pedaling. The first tooth 24 includes a first additional axial surface 24B disposed opposite the first axial surface 24A to engage with the other of the opposed pair of outer link plates BC2. The first additional axial surface 24B may include a first additional chain facing area to face the outer link plate BC2 in the axial direction D2 during the pedaling. The first maximum chain-engaging width W1 is defined between the first axial surface 24A and the first additional axial surface 24B in the axial direction D2. More specifically, the first maximum chain-engaging width W1 may be defined as an axial width between an axially outermost end point of the first chain facing area and an axially innermost end point of the first additional chain facing area in the axial direction D2. The first axial surface 24A is closer to the first side surface S1 than the first additional axial surface 24B in the axial direction D2. The second axial surface 26A is closer to the first side surface S1 than the second additional axial surface 26B in the axial direction D2.

As seen in FIG. 9, the second tooth 26 has a second maximum chain-engaging width W2 defined in the axial direction D2. The second maximum chain-engaging width W2 is smaller than the inner link space BC11. The second tooth 26 includes a second axial surface 26A to engage with one of the opposed pair of inner link plates BC1. The second axial surface 26A may include a second chain facing area to face the inner link plate BC1 in the axial direction D2 during the pedaling. The second tooth 26 includes a second additional axial surface 26B disposed opposite the second axial surface 26A to engage with the other of the opposed pair of outer link plates BC2. The second additional axial surface 26B may include a second additional chain facing area to face the inner link plate BC1 in the axial direction D2 during the pedaling. The second maximum chain-engaging width W2 is defined between the second axial surface 26A and the second additional axial surface 26B in the axial direction D2. More specifically, the second maximum chain-engaging width W2 may be defined as an axial width between an axially outermost end point of the second chain facing area and an axially innermost end point of the second additional chain facing area in the axial direction D2. The first axial surface 24A and the second axial surface 26A serve as a chain-engaging surface to engage with the bicycle chain BC.

As seen in FIG. 9, the axial center plane CP3 is defined at an axial center of the first axial surface 24A and the first additional axial surface 24B. The axial center plane CP3 can also be defined at an axial center of the second axial surface 26A and the second additional axial surface 26B. Specifically, the axial center plane CP3 is a plane perpendicular to the rotational center axis A1. The axial center plane CP3 extends through a center CW1 of the first maximum chain-engaging width W1 and extends through a center CW2 of the second maximum chain-engaging width W2. The axial center plane CP3 extends through a center CA1 of a line connecting an axial outermost end of the first axial surface 24A with an axial outermost end of the first additional axial surface 24B. The axial center plane CP3 extends through a center CA2 of a line connecting an axial outermost end of the second axial surface 26A with an axial outermost end of the second additional axial surface 26B. In this embodiment, the axial center plane of the first tooth 24 coincides with the axial center plane of the second tooth 26. However, the axial center plane of the first tooth 24 can be offset from the axial center plane of the second tooth 26 in the axial direction D2 (any one of inward and outward). Further, in this embodiment, although the axial center plane of the first tooth 24 coincides with an axial center plane of a first radially outermost end 24C (explained below), they can be offset from each other in the axial direction D2. Also, although the axial center plane of the second tooth coincides with an axial center plane of a second radially outermost end 26C (explained below), they can be offset from each other in the axial direction D2.

Figure 10:
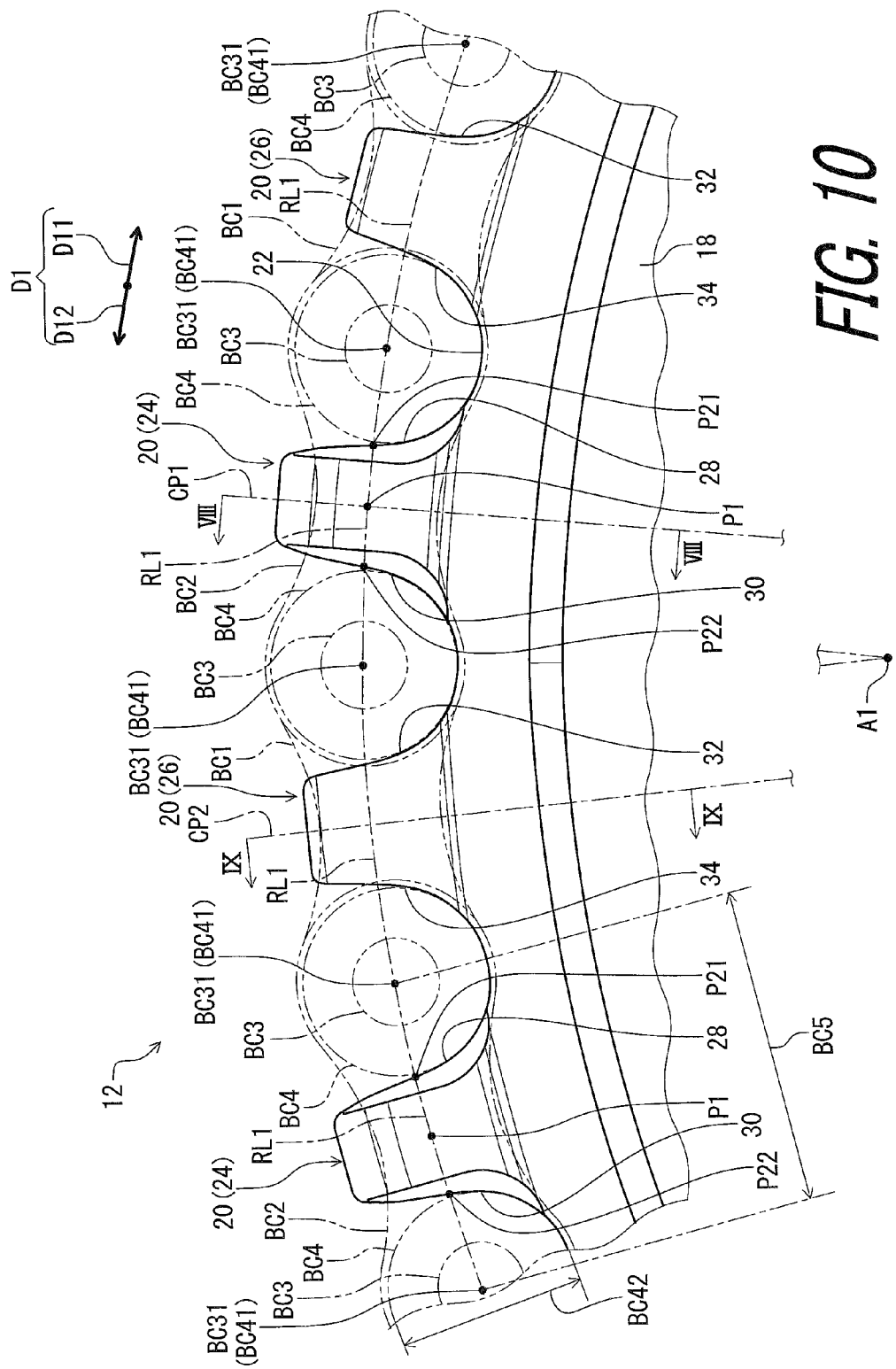
FIG. 10 is a partial side elevational view of the bicycle sprocket of the bicycle sprocket assembly illustrated in FIG. 1.
Figure 11:
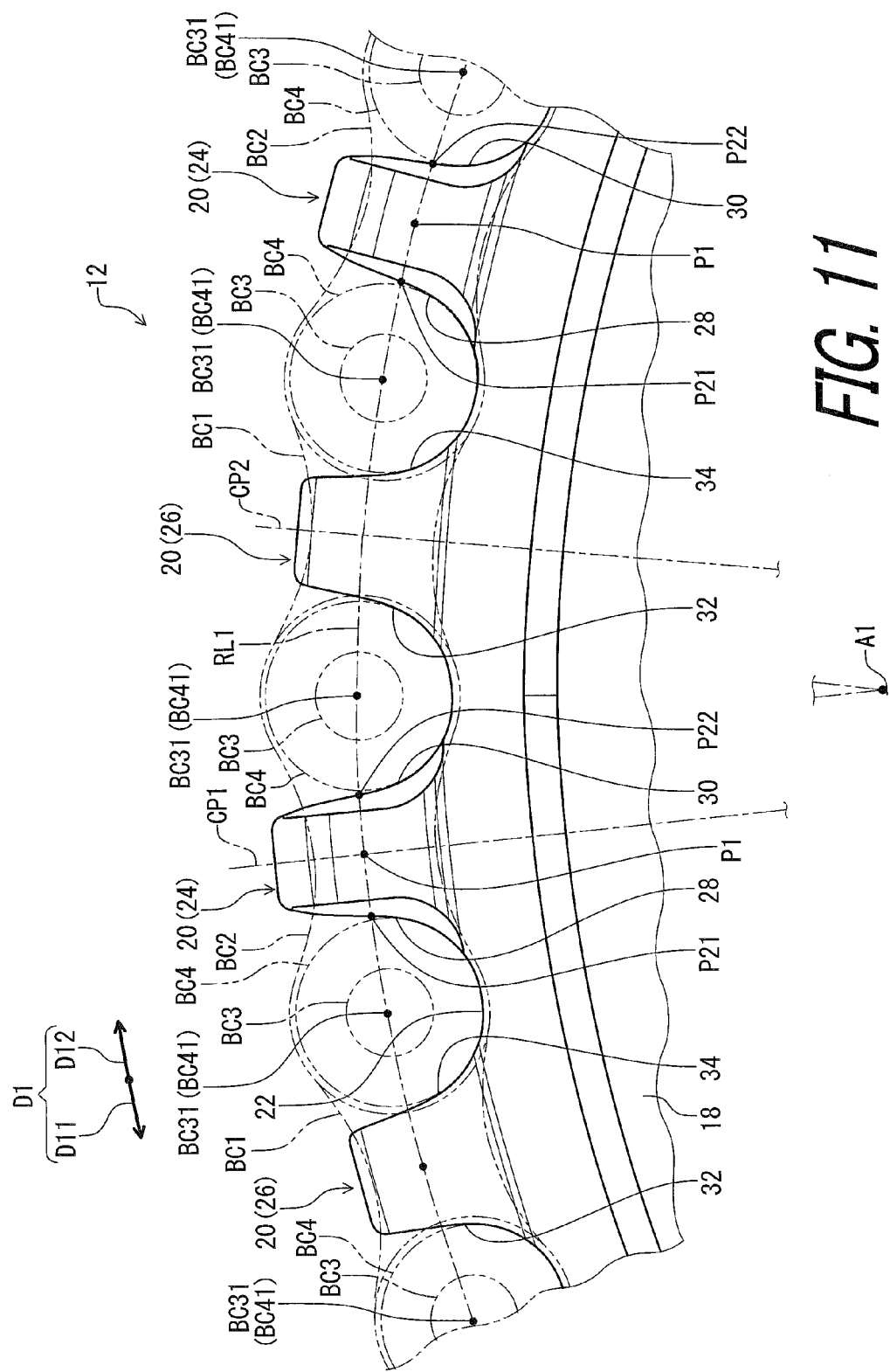
FIG. 11 is another partial side elevational view of the bicycle sprocket of the bicycle sprocket assembly illustrated in FIG. 1.

As seen in FIGS. 10 and 11, in the bicycle sprocket 12, a reference line RL1 is defined as a line connecting centers BC31 of neighboring pins BC3 of the bicycle chain BC engaged with the plurality of chain-driving teeth 20 when viewed from the axial direction D2. The reference line RL1 is a circular arc defined with respect to the bicycle sprocket 12 on a pitch circle diameter defined based on the centers BC31 of the neighboring pins BC3 of the bicycle chain BC in a state where the bicycle chain BC is completely engaged with the plurality of chain-driving teeth 20. The reference line RL1 can be defined based on centers BC41 of rollers BC4. The center BC41 of the roller BC4 coincides with the center BC31 of the pin BC3. The bicycle chain BC is completely engaged with the plurality of chain-driving teeth 20 in a state where the roller BC4 is disposed between the first tooth 24 and the second tooth 26 at a closest position to the rotational center axis A1.

The roller BC4 of the bicycle chain BC is offset from the reference line RL1 when the roller BC4 starts to disengage from the plurality of chain-driving teeth 20. A center point P1 is defined as a center point of the reference line RL1 between an intersection point P21 of the reference line RL1 and the first downstream circumferential surface 28 and an intersection point P22 of the reference line RL1 and the first upstream circumferential surface 30 when viewed from the axial direction D2. In this embodiment, for example, a chain pitch BC5 of the bicycle chain BC is 12.7 mm, and an outer diameter BC42 of the roller BC4 is 7.65 mm. However, the chain pitch BC5 and the outer diameter BC42 of the roller BC4 are not limited to this embodiment.

As seen in FIGS. 10 and 11, the first tooth 24 includes a circumferential center plane CP1 radially extending from the rotational center axis A1 through a center point P1 of the reference line RL1. The circumferential center plane CP1 is parallel to the rotational center axis A1. The downstream circumferential surface 28 is disposed on a downstream side of the circumferential center plane CP1 in the driving rotational direction D11. The upstream circumferential surface 30 is disposed on an upstream side of the circumferential center plane CP1 in the driving rotational direction D11.

The second tooth 26 includes a circumferential center plane CP2 radially extending from the rotational center axis A1 through the center point P1 of the reference line RL1. The circumferential center plane CP2 is parallel to the rotational center axis A1. The downstream circumferential surface 32 is disposed on a downstream side of the circumferential center plane CP2 in the driving rotational direction D11. The upstream circumferential surface 34 is disposed on an upstream side of the circumferential center plane CP2 in the driving rotational direction D11.

FIG. 8 is a cross-sectional view taken along the axial center plane CP3. As seen in FIG. 8, the first tooth 24 has a first width W11 defined in the axial direction D2. The first width W11 is defined at the reference position RP11 radially outward spaced apart from the center point P1 of a reference line RL1 by 1.5 mm. The first width W11 is 70% or more of the first maximum chain-engaging width W1. The first width W11 is preferably 80% or more of the first maximum chain-engaging width W1. The first width W11 is more preferably 90% or more of the first maximum chain-engaging width W1. However, the relationship between the first width W11 and the first maximum chain-engaging width W1 is not limited to this embodiment. For example, the first width W11 can be approximately 70% or more of the first maximum chain-engaging width W1. The first width W11 can be approximately 80% or more of the first maximum chain-engaging width W1. The first width W11 can be approximately 90% or more of the first maximum chain-engaging width W1. In this embodiment, the first width W11 is 91.8% of the first maximum chain-engaging width W1.

The first tooth 24 has a second width W12 defined in the axial direction D2. The second width W12 is defined at a reference position RP12 radially outward spaced apart from the center point P1 of the reference line RL1 by 1.0 mm. The second width W12 is 80% or more of the first maximum chain-engaging width W1. The second width W12 is preferably 90% or more of the first maximum chain-engaging width W1. The second width W12 is more preferably 95% or more of the first maximum chain-engaging width W1. In this embodiment, the second width W12 is equal to the first maximum chain-engaging width W1 (i.e. the second width W12 is 100% of the first maximum chain-engaging width W1.). However, the second width W12 is not limited to this embodiment. For example, the second width W12 can be approximately 80% or more of the first maximum chain-engaging width W1. The second width W12 can be approximately 90% or more of the first maximum chain-engaging width W1. The second width W12 can be approximately 95% or more of the first maximum chain-engaging width W1.

As seen in FIG. 8, the first maximum chain-engaging width W1 is defined at a reference position RP13 radially outward spaced apart from the center point P1 of the reference line RL1 by 0.5 mm. In other words, the first tooth 24 has a third width W13 defined in the axial direction D2 The third width W13 is defined at the reference position RP13 and is 100% of the first maximum chain-engaging width W1. However, the first maximum chain-engaging width W1 is not limited to this embodiment. For example, the first maximum chain-engaging width W1 can be defined at another reference position such as the reference position RP12 or a position that is radially inward spaced apart from the reference position RP13 such as the reference line PL1.

The first tooth 24 includes a first radially outermost end 24C. The first radially outermost end 24C is farther radially outward from the radially outer periphery 22 of the sprocket body 18 than the first axial surface 24A. The first radially outermost end 24C is farther radially outward from the radially outer periphery 22 of the sprocket body 18 than the first additional axial surface 24B. In this embodiment, the first radially outermost end 24C is radially farthest point of the first tooth 24 from the radially outer periphery 22 of the sprocket body 18.

As seen in FIG. 8, a minimum axial distance L11 defined between the first axial surface 24A and the first radially outermost end 24C in the axial direction D2 is equal to or smaller than 0.8 mm. More specifically, the minimum axial distance L11 is defined between an axially outermost end point 24A1 of the first chain facing area of the first axial surface 24A and an axially outermost end point 24C1 of the first radially outermost end 24C. In this embodiment, the center point P1 defined on the first axial surface 24A may be the axially outermost end point of the first chain facing area of the first axial surface 24A, for example. An additional minimum axial distance L12 defined between the first additional axial surface 24B and the first radially outermost end 24C in the axial direction D2 is equal to or smaller than 0.8 mm. More specifically, the minimum axial distance L12 is defined between an axially innermost end point 24B1 of the first additional chain facing area of the first additional axial surface 24B and an axially innermost end point 24C2 of the first radially outermost end 24C. In this embodiment, the center point P1 defined on the first additional axial surface 24B may be the axially innermost end point 24B1 of the first additional chain facing area of the first additional axial surface 24B, for example. However, the minimum axial distance L11 and the additional minimum axial distance L12 are not limited to this embodiment. For example, the minimum axial distance L11 defined between the first axial surface 24A and the first radially outermost end 24C in the axial direction D2 can be equal to or smaller than approximately 0.8 mm. The additional minimum axial distance L12 defined between the first additional axial surface 24B and the first radially outermost end 24C in the axial direction D2 can be equal to or smaller than approximately 0.8 mm.

The first tooth 24 includes a first inclined surface 24D extending between the first axial surface 24A and the first radially outermost end 24C. The first inclined surface 24D is inclined relative to the axial direction D2 to define a maximum angle AG11 between the first inclined surface 24D and the first axial surface 24A. The maximum angle AG11 is equal to or smaller than 25 degrees. However, the maximum angle AG11 is not limited to this embodiment. For example, the maximum angle AG11 can be equal to or smaller than approximately 25 degrees.

Figure 12:
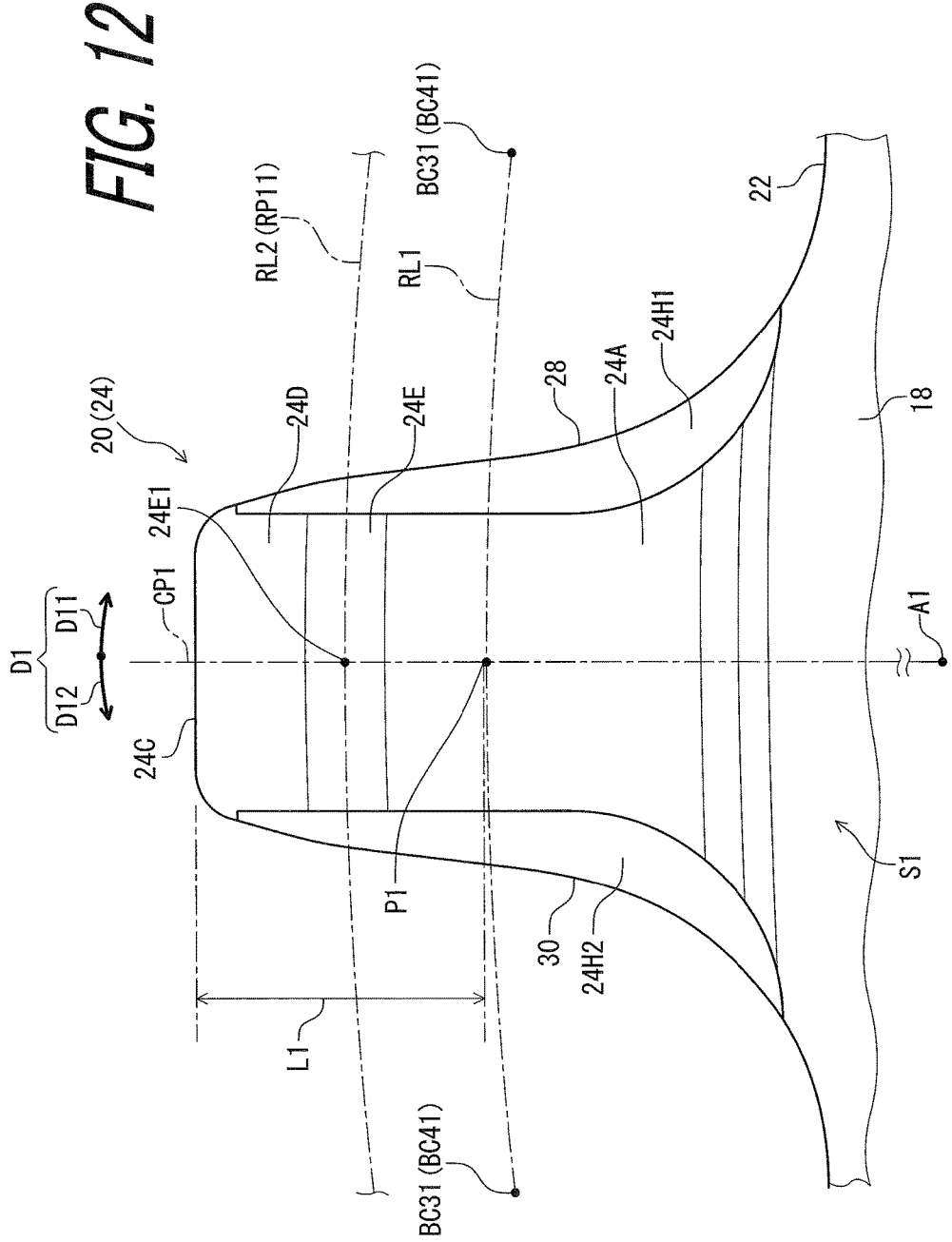
FIG. 12 is an enlarged side elevational view of a first tooth of the bicycle sprocket illustrated in FIG. 1.

As seen in FIG. 8 and FIG. 12, the first tooth 24 includes a coupling surface 24E coupling the first inclined surface 24D to the first axial surface 24A. The coupling surface 24E has a curved surface extending between the first inclined surface 24D and the first axial surface 24A. However, the shape of the coupling surface 24E is not limited to this embodiment and can be other shape such as a planner surface. The coupling surface 24E has a center 24E1 defined between the first inclined surface 24D and the first axial surface 24A when viewed from the axial direction D2. The center 24E1 of the coupling surface 24E is disposed radially outward from the reference line RL1 by a radial distance LE1 which is equal to or larger than 0.5 mm. The center 24E1 of the coupling surface 24E is preferably disposed at a position radially outward spaced apart from the reference line RL1 by 1.0 mm or more. However, a position of the center 24E1 of the coupling surface 24E is not limited to this embodiment. For example, the center 24E1 of the coupling surface 24E can be disposed radially outward from the reference line RL1 by a radial distance which is equal to or larger than approximately 0.5 mm. The center 24E1 of the coupling surface 24E can be disposed at a position radially outward spaced apart from the reference line RL1 by approximately 1.0 mm or more.

The first tooth 24 has a first radial length L1 radially defined from the reference line RL1 to the first radially outermost end 24C. The first radial length L1 is equal to or larger than 3.0 mm. The first radial length L1 is preferably equal to or smaller than 4.0 mm. However, the first radial length L1 is not limited to this embodiment. For example, the first radial length L1 can be equal to or larger than approximately 3.0 mm. The first radial length L1 can be equal to or smaller than approximately 4.0 mm.

As seen in FIG. 8, the first tooth 24 includes a first additional inclined surface 24F extending between the first additional axial surface 24B and the first radially outermost end 24C. The first additional inclined surface 24F is inclined relative to the axial direction D2 to define a maximum angle AG12 between the first additional inclined surface 24F and the first additional axial surface 24B. The maximum angle AG12 is equal to or smaller than 25 degrees. However, the maximum angle AG12 can be limited to this embodiment. For example, the maximum angle AG12 can be equal to or smaller than approximately 25 degrees. In this embodiment, the maximum angle AG11 and the maximum angle AG12 are equal to each other. However, the maximum angle AG11 can be different from the maximum angle AG12.

Figure 13:
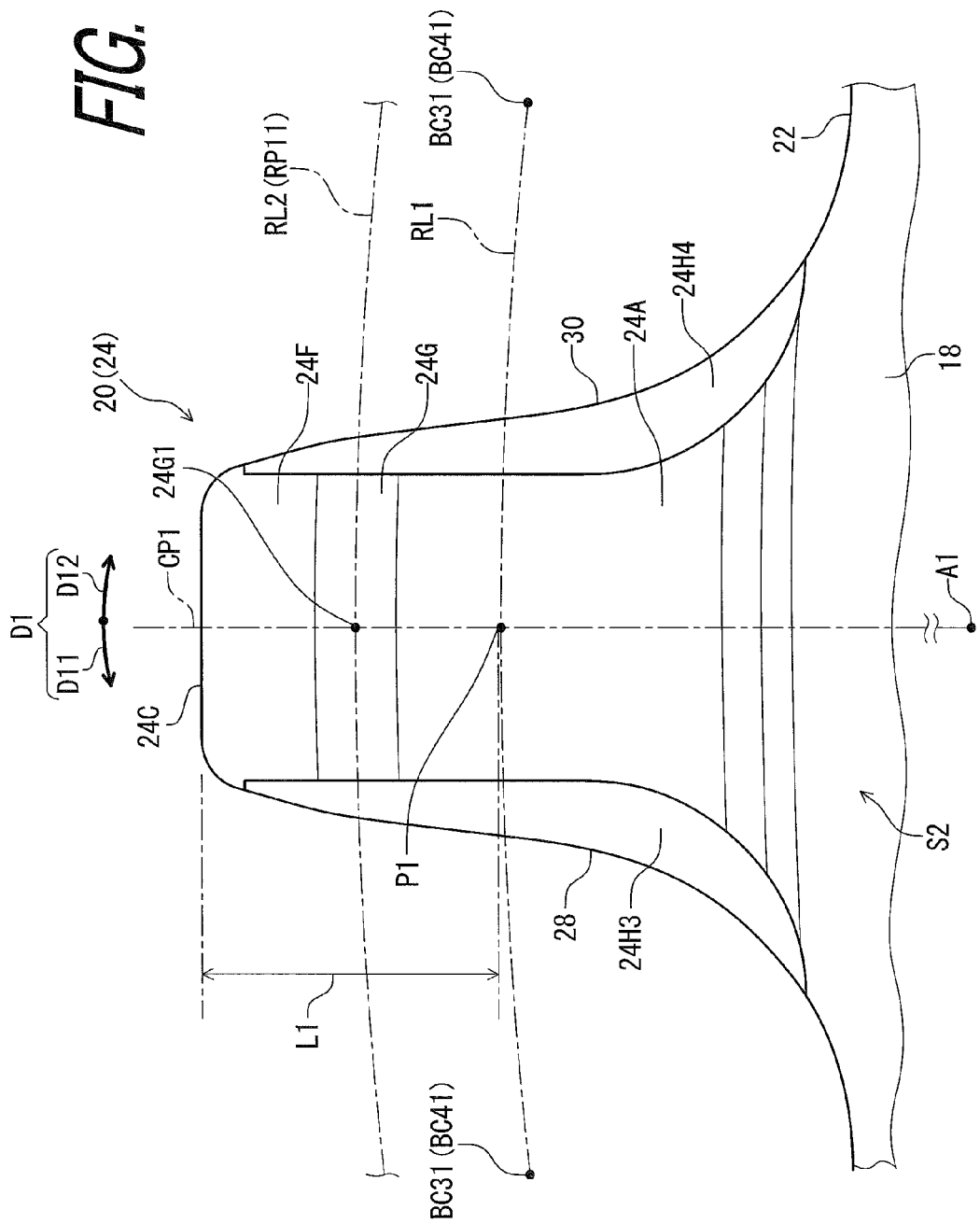
FIG. 13 is another enlarged side elevational view of the first tooth of the bicycle sprocket illustrated in FIG. 1.

As seen in FIG. 13, the first tooth 24 includes an additional coupling surface 24G coupling the first additional inclined surface 24F to the first axial surface 24A. The additional coupling surface 24G has a curved surface extending between the first additional inclined surface 24F and the first axial surface 24A. However, the shape of the additional coupling surface 24G is not limited to this embodiment and can be other shape such as a planner surface. The additional coupling surface 24G has a center 24G1 defined between the first additional inclined surface 24F and the first axial surface 24A when viewed from the axial direction D2. The center 24G1 of the additional coupling surface 24G is disposed radially outward from the reference line RL1 by a radial distance LG1 which is equal to or larger than 0 5 mm. The center 24G1 of the additional coupling surface 24G is preferably disposed at a position radially outward spaced apart from the reference line RL1 by 1.0 mm or more. However, a position of the center 24G1 of the additional coupling surface 24G is not limited to this embodiment. For example, the center 24G1 of the additional coupling surface 24G can be disposed radially outward from the reference line RL1 by a radial distance which is equal to or larger than approximately 0.5 mm. The center 24G1 of the additional coupling surface 24G can be disposed at a position radially outward spaced apart from the reference line RL1 by approximately 1.0 mm or more.

Figure 14:
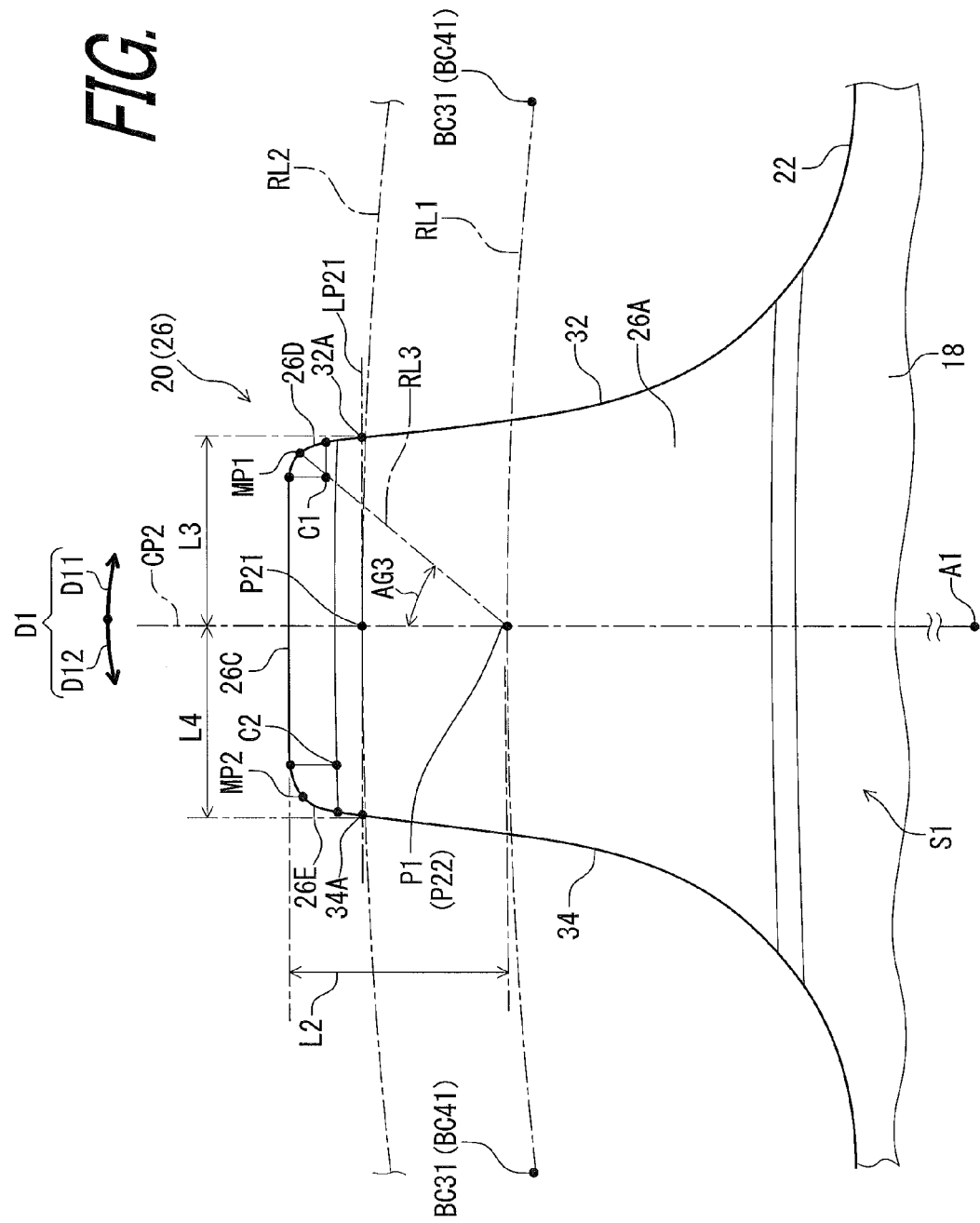
FIG. 14 is an enlarged side elevational view of a second tooth of the bicycle sprocket illustrated in FIG. 1.

As seen in FIG. 14, the second tooth 26 includes a second radially outermost end 26C. The second radially outermost end 26C is farther radially outward from the radially outer periphery 22 of the sprocket body 18 than the second axial surface 26A. The second radially outermost end 26C is farther radially outward from the radially outer periphery 22 of the sprocket body 18 than the second additional axial surface 26B. In this embodiment, the second radially outermost end 26C is radially farthest point of the second tooth 26 from the radially outer periphery 22 of the sprocket body 18.

The second tooth 26 has a second radial length L2 radially defined from the reference line RL1 to the second radially outermost end 26C. The second radial length L2 is in a range of 1.5 mm to 2.9 mm. The second radial length L2 is preferably in a range of 2.0 mm to 2.5 mm. The second radial length L2 is preferably in a range of 2.5 mm to 2.9 mm. However, the second radial length L2 is not limited to this embodiment. For example, the second radial length L2 can be in a range of approximately 1.5 mm to approximately 2.9 mm. The second radial length L2 can be in a range of approximately 2.0 mm to approximately 2.5 mm. The second radial length L2 can be in a range of approximately 2.5 mm to approximately 2.9 mm.

Figure 15:
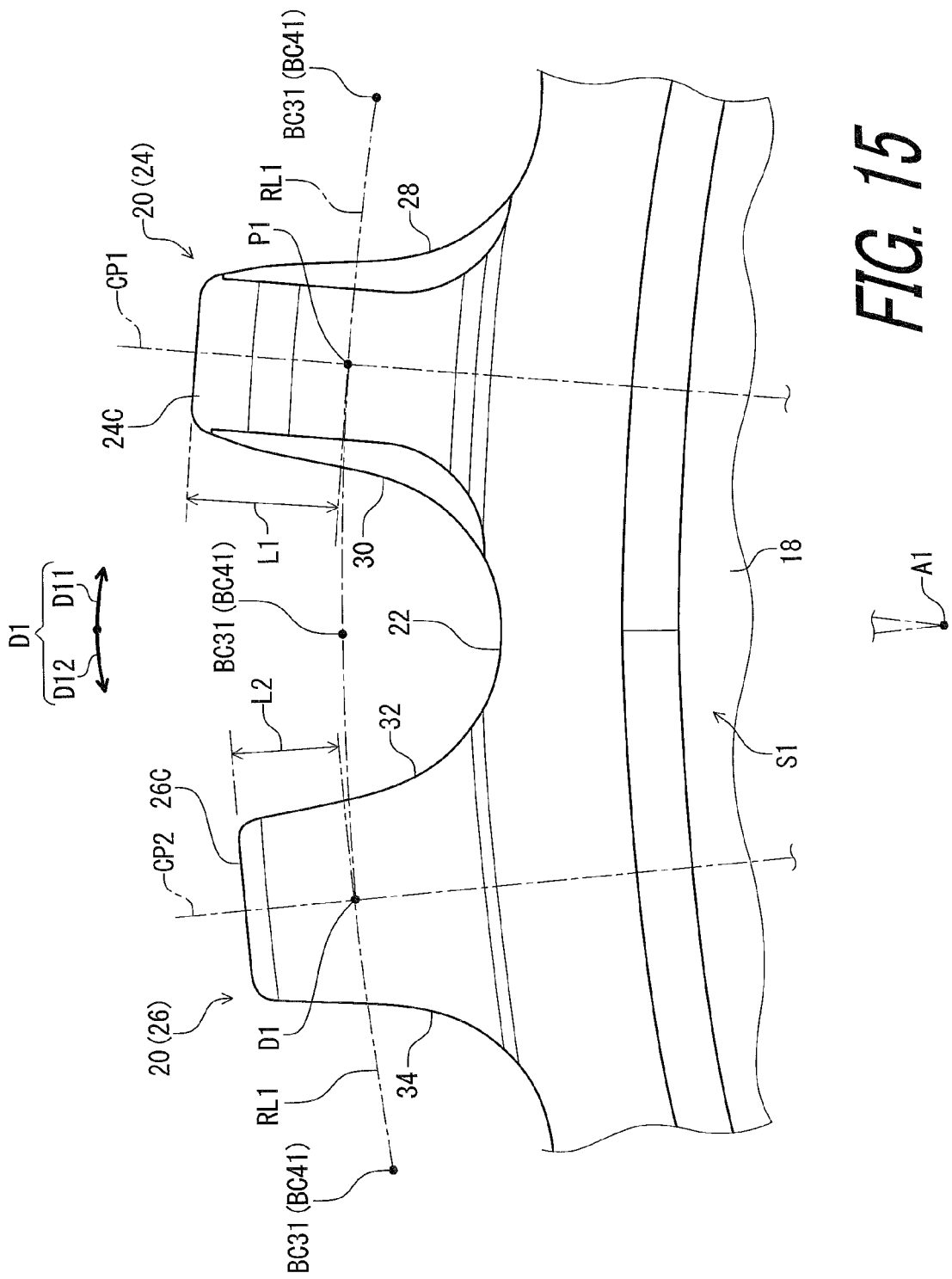
FIG. 15 is an enlarged side elevational view of the first tooth and the second tooth of the bicycle sprocket illustrated in FIG. 1.

In this embodiment, as seen in FIG. 15, the first radial length L1 is larger than the second radial length L2. However, the first radial length L1 can be equal to or smaller than the second radial length L2. A difference between the first radial length L1 and the second radial length L2 is equal to or smaller than 1.5 mm. A difference between the first radial length L1 and the second radial length L2 is preferably equal to or smaller than 1.0 mm. However, the difference between the first radial length L1 and the second radial length L2 is not limited to this embodiment. For example, the difference between the first radial length L1 and the second radial length L2 can be equal to or smaller than approximately 1.5 mm. The difference between the first radial length L1 and the second radial length L2 can be equal to or smaller than approximately 1.0 mm.

As seen in FIG. 14, the second tooth 26 includes a shortest distance L3 defined between the downstream circumferential surface 32 and a first intersection point P21 of the circumferential center plane CP2 and an additional reference line RL2. Specifically, a line LP21 is defined to extend through the first intersection point P21 and to be perpendicular to the circumferential center plane CP2 when viewed from the axial direction D2. The line LP21 intersects with the downstream circumferential surface 32 at a downstream point 32A. The shortest distance L3 is defined from the first intersection point P21 to the downstream point 32A. The shortest distance L3 is equal to or larger than 2.0 mm. However, the shortest distance L3 is not limited to this embodiment. For example, the shortest distance L3 can be equal to or larger than approximately 2.0 mm.

The additional reference line RL2 is defined at a reference position radially outward spaced apart from the reference line RL1 by 1.5 mm. Specifically, the additional reference line RL2 is a circular arc which is disposed radially outward of the reference line RL1 by 1.5 mm and which has the same center (the rotational center axis A1) as that of the reference line RL1. However, a position of the additional reference line RL2 is not limited to this embodiment. For example, the additional reference line RL2 can be defined at a reference position radially outward spaced apart from the reference line RL1 by approximately 1.5 mm.

The second tooth 26 includes an additional shortest distance L4 defined between the circumferential center plane CP2 and the upstream circumferential surface 34 on the additional reference line RL2. Specifically, the line LP21 intersects with the upstream circumferential surface 34 at an upstream point 34A. The additional shortest distance L4 is defined from the first intersection point P21 to the upstream point 34A. The additional shortest distance L4 is smaller than 2.0 mm. However, the additional shortest distance L4 is not limited to this embodiment. For example, the additional shortest distance L4 can be smaller than approximately 2.0 mm. In this embodiment, the additional shortest distance L4 is approximately same as the shortest distance L3.

As seen in FIG. 14, the second tooth 26 includes a downstream connecting surface 26D and an upstream connecting surface 26E. The downstream connecting surface 26D extends between the second downstream circumferential surface 32 and the second radially outermost end 26C. The upstream connecting surface 26E extends between the second upstream circumferential surface 34 and the second radially outermost end 26C.

The downstream connecting surface 26D includes a middle point MP1 defined between the downstream circumferential surface 32 and the second radially outermost end 26C when viewed from the axial direction D2. For example, the middle point MP1 is a middle point of the downstream connecting surface 26D when viewed from the axial direction D2. The upstream connecting surface 26E includes a middle point MP2 defined between the upstream circumferential surface 34 and the second radially outermost end 26C when viewed from the axial direction D2. For example, the middle point MP2 is a middle point of the upstream connecting surface 26E when viewed from the axial direction D2. In this embodiment, the downstream connecting surface 26D includes a curved surface having a center C1 of a circular arc. The upstream connecting surface 26E includes a curved surface having a center C2 of a circular arc. However, the shape of each of the downstream connecting surface 26D and the upstream connecting surface 26E is not limited to this embodiment.

As seen in FIG. 14, an inclined reference line RL3 is defined between the middle point MP1 of the downstream connecting surface 26D and a second intersection point P22 of the circumferential center plane CP2 and the reference line RL1 when viewed from the axial direction D2. An inclination angle AG3 defined between the circumferential center plane CP2 and the inclined reference line RL3 is in a range of 32 degrees to 52 degrees when viewed from the axial direction D2, if the second radial length L2 is in a range of 2.0 mm to 2.5 mm. The inclination angle AG3 defined between the circumferential center plane CP2 and the inclined reference line RL3 is preferably in a range of 29 degrees to 36.4 degrees when viewed from the axial direction D2, if the second radial length L2 is in a range of 2.5 mm to 3.0 mm.

However, the inclination angle AG3 is not limited to this embodiment. The inclination angle AG3 defined between the circumferential center plane CP2 and the inclined reference line RL3 can be in a range of approximately 32 degrees to approximately 52 degrees when viewed from the axial direction D2. The inclination angle AG3 defined between the circumferential center plane CP2 and the inclined reference line RL3 can be in a range of approximately 29 degrees to approximately 36.4 degrees when viewed from the axial direction D2.

As seen in FIGS. 3 to 6, the first tooth 24 includes recesses 24H1, 24H2, 24H3, and 24H4 to reduce interference between the first tooth 24 and the inner link plate BC1 of the bicycle chain BC. The recess 24H1 is provided between the downstream circumferential surface 28 and the first axial surface 24A. The recess 24H2 is provided between the upstream circumferential surface 30 and the first axial surface 24A. The recess 24H3 is provided between the downstream circumferential surface 28 and the first additional axial surface 24B. The recess 24H4 is provided between the upstream circumferential surface 30 and the first additional axial surface 24B. At least one of the recesses 24H1, 24H2, 24H3, and 24H4 can be omitted from the first tooth 24. Furthermore, the second tooth 26 does not include a recess such as the recesses 24H1, 24H2, 24H3, and 24H4. However, the second tooth 26 can include a recess such as the recesses 24H1, 24H2, 24H3, and 24H4.

As seen in FIG. 14, the shortest distance L3 is defined between the downstream circumferential surface 28 and the first intersection point P21 of the circumferential center plane CP2 and the additional reference line RL2. The shortest distance L3 is equal to or larger than 2.0 mm. The additional reference line RL2 is defined at the reference position radially outward spaced apart from the reference line RL1 by 1.5 mm. Accordingly, it is possible to provide an earlier timing at which the second tooth 26 catches the opposed pair of inner link plates BC1 of the bicycle chain BC. Accordingly, it is possible to smoothly bring the second tooth 26 into engagement with the opposed pair of inner link plates BC1 even if the bicycle chain BC is largely inclined relative to the bicycle sprocket 12 when viewed from above the bicycle sprocket 12. This can improve a chain-holding performance of the bicycle sprocket 12.

Figure 16:
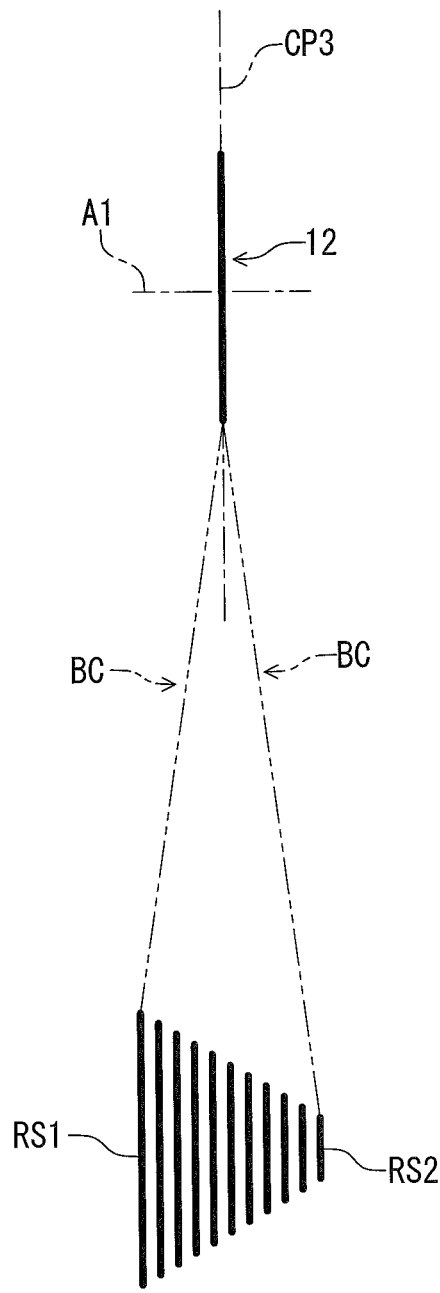
FIG. 16 is a schematic diagram showing an inclination of a bicycle chain engaged with the bicycle sprocket assembly and another sprocket assembly.
Figure 17:
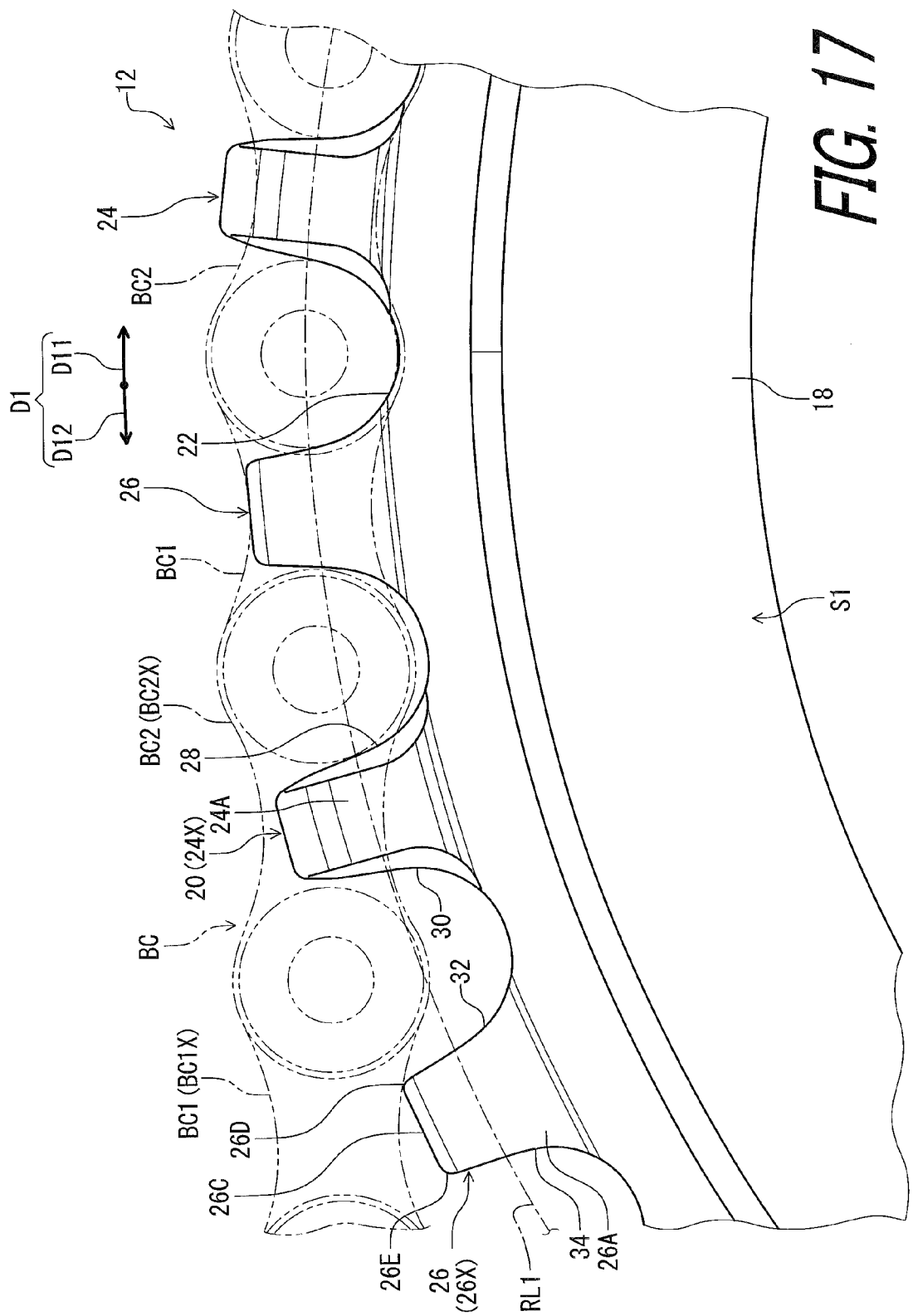
FIG. 17 is a partial side elevational view of the bicycle sprocket illustrated in FIG. 1 with the bicycle chain.
Figure 18:
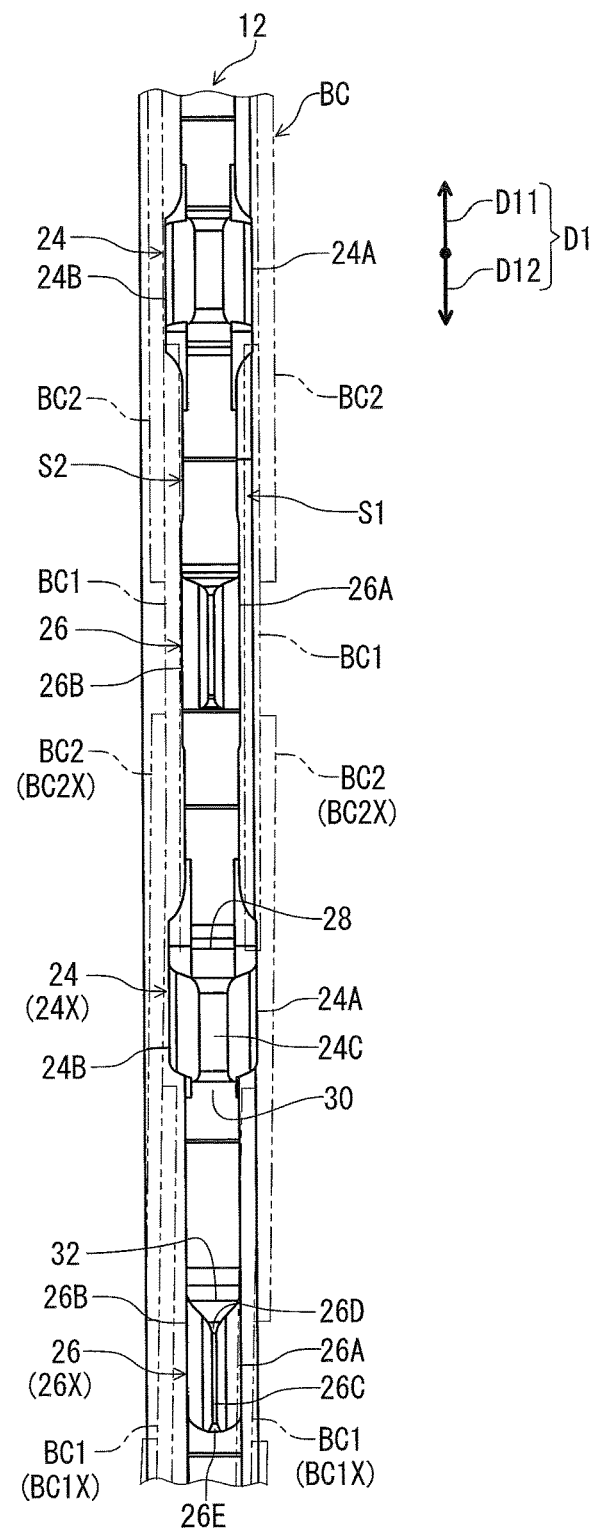
FIG. 18 is a top view of the bicycle sprocket illustrated in FIG. 1 with the bicycle chain.

For example, as seen in FIG. 16, the bicycle chain BC is largely inclined relative to the axial center plane CP3 of the bicycle sprocket 12 in a state where the bicycle chain BC is engaged with a largest rear sprocket RS1 or a smallest rear sprocket RS2. As seen in FIGS. 17 and 18, the second tooth 26X is inserted between the opposed pair of inner link plates BC1X in a state where the opposed pair of outer link plates BC2X is held by the first tooth 24X. Since the shortest distance L3 is equal to or larger than 2.0 mm, it is possible to provide an earlier timing at which the second tooth 26X catches the opposed pair of inner link plates BC1X. Accordingly, it is possible to smoothly bring the second tooth 26X into engagement with the opposed pair of inner link plates BC1X even if the bicycle chain BC is largely inclined relative to the bicycle sprocket 12 when viewed from above the bicycle sprocket 12. This can improve the chain-holding performance of the bicycle sprocket 12.

Second Embodiment

A bicycle sprocket assembly 210 comprising a bicycle sprocket 212 in accordance with a second embodiment will be described below referring to FIG. 19. The bicycle sprocket 212 has the same structure as that of the bicycle sprocket 12 except for the second tooth 26. Thus, elements having substantially the same function as those in the first embodiment will be numbered the same here, and will not be described and/or illustrated again in detail here for the sake of brevity.

As seen in FIG. 19, in the bicycle sprocket 212, the plurality of chain-driving teeth 20 includes a second tooth 226. The second tooth 226 has substantially the same structure as that of the second tooth 26 of the first embodiment. Unlike the second tooth 26, in the second tooth 226, the downstream connecting surface 26D is farther radially outward from the reference line RL1 than the upstream connecting surface 26E. The middle point MP1 of the downstream connecting surface 26D is radially outward farther from the reference line RL1 than the middle point MP2 of the upstream connecting surface 26E. The second radially outermost end 26C is inclined to gradually decrease a radial distance defined between the second radially outermost end 26C and the reference line RL1 from the downstream connecting surface 26D to the upstream connecting surface 26E.

With the bicycle sprocket assembly 210 and the bicycle sprocket 212, it is possible to obtain substantially the same effects as those of the bicycle sprocket assembly 210 and the bicycle sprocket 212 of the first embodiment.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the terms "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
  a sprocket body including a radially outer periphery provided about a rotational center axis of the bicycle sprocket; and
  a plurality of chain-driving teeth provided on the radially outer periphery to engage with a bicycle chain, the plurality of chain-driving teeth comprising:
    a first tooth having a first maximum chain-engaging width defined in an axial direction parallel to the rotational center axis, the first tooth including a first radially outermost end radially farthest from the radially outer periphery of the sprocket body, the first tooth having a first radial length radially defined from a reference line to the first radially outermost end; and
    a second tooth having a second chain-engaging maximum width defined in the axial direction, the first maximum chain-engaging width being larger than an inner link space defined between an opposed pair of inner link plates of the bicycle chain and smaller than an outer link space defined between an opposed pair of outer link plates of the bicycle chain, the second chain-engaging maximum width being smaller than the inner link space, the second tooth including a second radially outermost end radially farthest from the radially outer periphery of the sprocket body, the second tooth having a second radial length radially defined from the reference line to the second radially outermost end, the second radial length being in a range of 1.5 mm to 2.9 mm,
  the second tooth including
    a circumferential center plane radially extending from the rotational center axis through a center point of a reference line, the reference line being defined to connect centers of pins of the bicycle chain engaged with the plurality of chain-driving teeth,
    a downstream circumferential surface facing in a driving rotational direction in which the bicycle sprocket rotates about the rotational center axis during pedaling, the downstream circumferential surface being disposed on a downstream side of the circumferential center plane in the driving rotational direction,
    a shortest distance defined between the downstream circumferential surface and a first intersection point of the circumferential center plane and an additional reference line, the shortest distance being equal to or larger than 2.0 mm, the additional reference line being defined at a reference position radially outward spaced apart from the reference line by 1.5 mm,
- a downstream connecting surface extending between the downstream circumferential surface and the second radially outermost end, the downstream connecting surface including a middle point defined between the downstream circumferential surface and the second radially outermost end when viewed from the axial direction, and
- a tangential line extending tangentially with respect to the downstream circumferential surface at the intersection between the reference line and the downstream circumferential surface, the middle point of the downstream connecting surface being disposed between the tangential line and the circumferential center plane when viewed from the axial direction, the downstream connecting surface including a curved surface on which the middle point is disposed, wherein the downstream circumferential surface is free of a convex surface between the reference line and the additional reference line.

2. The bicycle sprocket according to claim 1, wherein the second tooth includes
- an upstream circumferential surface facing in a reversing rotational direction opposite to the driving rotational direction, the upstream circumferential surface being disposed on an upstream side of the circumferential center plane in the driving rotational direction, and
- an upstream connecting surface extending between the upstream circumferential surface and the second radially outermost end, and the downstream connecting surface is farther radially outward from the reference line than the upstream connecting surface.

3. The bicycle sprocket according to claim 1, wherein the second tooth includes
- an upstream circumferential surface facing in a reversing rotational direction opposite to the driving rotational direction, the upstream circumferential surface being disposed on an upstream side of the circumferential center plane in the driving rotational direction, and
- an additional shortest distance defined between the circumferential center plane and the upstream circumferential surface on the additional reference line, the additional shortest distance being smaller than 2.0 mm.

4. The bicycle sprocket according to claim 1, further comprising
a crank attachment part to couple the sprocket body to a bicycle crank.

5. A bicycle sprocket assembly comprising:
the bicycle sprocket according to claim 1, the bicycle sprocket being a single sprocket without another sprocket in the bicycle sprocket assembly.

6. The bicycle sprocket according to claim 1, wherein an entirety of the curved surface of the downstream connecting surface is disposed radially outward of the reference line.

7. The bicycle sprocket according to claim 1, wherein the curved surface of the downstream connecting surface is curved around a center that is spaced from the middle point in the driving rotational direction.

8. The bicycle sprocket according to claim 1, wherein the curved surface is curved along a direction that is different than a direction along which the downstream circumferential surface is curved.

9. A bicycle sprocket comprising:
a sprocket body including a radially outer periphery provided about a rotational center axis of the bicycle sprocket; and
a plurality of chain-driving teeth provided on the radially outer periphery to engage with a bicycle chain, the plurality of chain-driving teeth comprising:
- a first tooth having a first maximum chain-engaging width defined in an axial direction parallel to the rotational center axis, the first tooth including a first radially outermost end radially farthest from the radially outer periphery of the sprocket body, the first tooth having a first radial length radially defined from a reference line to the first radially outermost end; and
- a second tooth having a second chain-engaging maximum width defined in the axial direction, the first maximum chain-engaging width being larger than an inner link space defined between an opposed pair of inner link plates of the bicycle chain and smaller than an outer link space defined between an opposed pair of outer link plates of the bicycle chain, the second chain-engaging maximum width being smaller than the inner link space, the second tooth including a second radially outermost end radially farthest from the radially outer periphery of the sprocket body, the second tooth having a second radial length radially defined from the reference line to the second radially outermost end, the second radial length being in a range of 1.5 mm to 2.9 mm, the second tooth including
- a circumferential center plane radially extending from the rotational center axis through a center point of a reference line, the reference line being defined to connect centers of pins of the bicycle chain engaged with the plurality of chain-driving teeth,
- a downstream circumferential surface facing in a driving rotational direction in which the bicycle sprocket rotates about the rotational center axis during pedaling, the downstream circumferential surface being disposed on a downstream side of the circumferential center plane in the driving rotational direction, and
- a shortest distance defined between the downstream circumferential surface and a first intersection point of the circumferential center plane and an additional reference line, the shortest distance being equal to or larger than 2.0 mm, the additional reference line being defined at a reference position radially outward spaced apart from the reference line by 1.5 mm, wherein the first radial length is larger than the second radial length.

10. The bicycle sprocket according to claim 9, wherein the second radial length is in a range of 2.0 mm to 2.5 mm.

11. The bicycle sprocket according to claim 10, wherein the second tooth includes a downstream connecting surface extending between the downstream circumferential surface and the second radially outermost end, the downstream connecting surface including a middle point defined between the downstream circumferential surface and the second radially outermost end when viewed from the axial direction, an inclined reference line is defined between the middle point of the downstream connecting surface and a second intersection point of the circumferential center plane and the reference line when viewed from the axial direction, and an inclination angle defined between the circumferential center plane and the inclined reference line is in a range of 32 degrees to 52 degrees when viewed from the axial direction.

12. The bicycle sprocket according to claim 9, wherein the second radial length is in a range of 2.5 mm to 2.9 mm.

13. The bicycle sprocket according to claim 12, wherein the second tooth includes a downstream connecting surface extending between the downstream circumferential surface and the second radially outermost end, the downstream connecting surface including a middle point defined between the downstream circumferential surface and the second radially outermost end when viewed from the axial direction, an inclined reference line is defined between the middle point of the downstream connecting surface and a second intersection point of the circumferential center plane and the reference line when viewed from the axial direction, and an inclination angle defined between the circumferential center plane and the inclined reference line is in a range of 29 degrees to 36.4 degrees when viewed from the axial direction.

14. The bicycle sprocket according to claim 9, wherein a difference between the first radial length and the second radial length is equal to or smaller than 1.5 mm.

15. The bicycle sprocket according to claim 9, wherein a difference between the first radial length and the second radial length is equal to or smaller than 1.0 mm.

16. The bicycle sprocket according to claim 9, wherein the first radial length is equal to or larger than 3.0 mm.

17. The bicycle sprocket according to claim 9, wherein the first radial length is equal to or smaller than 4.0 mm.

18. The bicycle sprocket according to claim 16, wherein the upstream connecting surface includes a middle point defined between the upstream circumferential surface and the second radially outermost end when viewed from the axial direction, and the middle point of the downstream connecting surface is radially outward farther from the reference line than the middle point of the upstream connecting surface.

19. A bicycle sprocket comprising:
a sprocket body including a radially outer periphery provided about a rotational center axis of the bicycle sprocket; and
a plurality of chain-driving teeth provided on the radially outer periphery to engage with a bicycle chain, the plurality of chain-driving teeth comprising:
   a first tooth having a first maximum chain-engaging width defined in an axial direction parallel to the rotational center axis, the first tooth including a first radially outermost end radially farthest from the radially outer periphery of the sprocket body, the first tooth having a first radial length radially defined from a reference line to the first radially outermost end; and
   a second tooth having a second chain-engaging maximum width defined in the axial direction, the first maximum chain-engaging width being larger than an inner link space defined between an opposed pair of inner link plates of the bicycle chain and smaller than an outer link space defined between an opposed pair of outer link plates of the bicycle chain, the second chain-engaging maximum width being smaller than the inner link space, the second tooth including a second radially outermost end radially farthest from the radially outer periphery of the sprocket body, the second tooth having a second radial length radially defined from the reference line to the second radially outermost end, the second tooth including
   a circumferential center plane radially extending from the rotational center axis through a center point of a reference line, the reference line being defined to connect centers of pins of the bicycle chain engaged with the plurality of chain-driving teeth,
   a downstream circumferential surface facing in a driving rotational direction in which the bicycle sprocket rotates about the rotational center axis during pedaling, the downstream circumferential surface being disposed on a downstream side of the circumferential center plane in the driving rotational direction, and
   a shortest distance defined between the downstream circumferential surface and a first intersection point of the circumferential center plane and an additional reference line, the additional reference line being defined at a reference position radially outward spaced apart from the reference line, wherein the first radial length is larger than the second radial length, and the shortest distance is equal to or larger than 2.0 mm.

20. The bicycle sprocket according to claim 19, wherein the second tooth includes a downstream connecting surface extending between the downstream circumferential surface and the second radially outermost end, the downstream connecting surface including a middle point defined between the downstream circumferential surface and the second radially outermost end when viewed from the axial direction, an inclined reference line is defined between the middle point of the downstream connecting surface and a second intersection point of the circumferential center plane and the reference line when viewed from the axial direction, and an inclination angle defined between the circumferential center plane and the inclined reference line is in a range of 32 degrees to 52 degrees when viewed from the axial direction.

21. The bicycle sprocket according to claim 19, wherein the second tooth includes a downstream connecting surface extending between the downstream circumferential surface and the second radially outermost end, the downstream connecting surface including a middle point defined between the downstream circumferential surface and the second radially outermost end when viewed from the axial direction, an inclined reference line is defined between the middle point of the downstream connecting surface and a second intersection point of the circumferential center plane and the reference line when viewed from the axial direction, and an inclination angle defined between the circumferential center plane and the inclined reference line is in a range of 29 degrees to 36.4 degrees when viewed from the axial direction.

22. The bicycle sprocket according to claim 19, wherein the second tooth includes a downstream connecting surface extending between the downstream circumferential surface and the second radially outermost end, an upstream circumferential surface facing in a reversing rotational direction opposite to the driving rotational direction, the upstream circumferential surface being disposed on an upstream side of the circumferential center plane in the driving rotational direction, and an upstream connecting surface extending between the upstream circumferential surface and the second radially outermost end, and the downstream connecting surface is farther radially outward from the reference line than the upstream connecting surface.

23. The bicycle sprocket according to claim 19, further comprising a crank attachment part to couple the sprocket body to a bicycle crank.

* * * * *